United States Patent
Ozawa

(10) Patent No.: US 7,970,225 B2
(45) Date of Patent: Jun. 28, 2011

(54) IMAGE PROCESSING DEVICE, IMAGE PROCESSING METHOD, IMAGE PROCESSING PROGRAM AND COMPUTER-READABLE RECORDING MEDIUM ON WHICH THE PROGRAM IS RECORDED

(75) Inventor: Masahiro Ozawa, Tokyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 12/659,855

(22) Filed: Mar. 24, 2010

(65) Prior Publication Data

US 2010/0208995 A1 Aug. 19, 2010

Related U.S. Application Data

(62) Division of application No. 10/699,700, filed on Nov. 4, 2003, now Pat. No. 7,715,640.

(30) Foreign Application Priority Data

Nov. 5, 2002 (JP) ................................. 2002-321406
Nov. 22, 2002 (JP) ................................. 2002-339741

(51) Int. Cl.
*G06K 9/34* (2006.01)
*G06K 9/36* (2006.01)
*G06K 9/46* (2006.01)

(52) U.S. Cl. ...................... 382/239; 382/176; 382/232
(58) Field of Classification Search .................. 382/239, 382/232, 176
See application file for complete search history.

(56) References Cited

U.S. PATENT DOCUMENTS

| 5,479,587 A | * | 12/1995 | Campbell et al. ............ 358/1.17 |
| 5,568,571 A | | 10/1996 | Willis et al. |
| 5,638,498 A | | 6/1997 | Tyler et al. |
| 5,767,978 A | | 6/1998 | Revankar et al. |
| 5,949,968 A | | 9/1999 | Gentile |
| 5,966,468 A | | 10/1999 | Fujimoto |
| 5,982,937 A | * | 11/1999 | Accad ............................. 382/239 |

(Continued)

FOREIGN PATENT DOCUMENTS

EP 597571 A2 5/1994

(Continued)

OTHER PUBLICATIONS

Queiroz, R., "Mixed Raster Content MRC model for compound image compression." SPIE, vol. 3653, 1998, pp. 1106-1117.

(Continued)

*Primary Examiner* — Bhavesh M Mehta
*Assistant Examiner* — Bernard Krasnic
(74) *Attorney, Agent, or Firm* — Buchanan Ingersoll & Rooney PC

(57) ABSTRACT

An image processing device includes a processor controlling one or more components of the image processing device, a region extraction unit for separating and extracting a character region, a graphic region and a photograph region from image data; a region compression unit for performing a compression process for each of the region data extracted by the region extraction unit; a region synthesis unit for synthesizing the region data compressed by the region compression unit; and an image size calculation unit for calculating an image size of specific region data extracted by the region extraction unit. The region compression unit selectively uses a first compression method or a second compression method to perform the compression process for the specific region data.

15 Claims, 12 Drawing Sheets

U.S. PATENT DOCUMENTS

| | | |
|---|---|---|
| 6,192,155 B1 | 2/2001 | Fan |
| 6,298,173 B1 | 10/2001 | Lopresti |
| 6,341,176 B1 | 1/2002 | Shirasaki et al. |
| 6,373,981 B1 | 4/2002 | de Queiroz et al. |
| 6,687,022 B1 * | 2/2004 | Lapstun et al. ............ 358/1.9 |
| 6,778,291 B1 | 8/2004 | Clouthier |
| 6,973,213 B2 | 12/2005 | Fan et al. |
| 6,985,628 B2 | 1/2006 | Fan |
| 2002/0181792 A1 | 12/2002 | Kojima |
| 2003/0118234 A1 | 6/2003 | Tanaka et al. |
| 2003/0132960 A1 | 7/2003 | Litwiller |
| 2003/0164989 A1 | 9/2003 | Yajima |
| 2004/0001634 A1 * | 1/2004 | Mehrotra ................ 382/232 |

FOREIGN PATENT DOCUMENTS

| | | |
|---|---|---|
| JP | 05-110737 | 7/1993 |
| JP | 07-298062 | 11/1995 |
| JP | H8-102860 | 4/1996 |
| JP | 08-139938 | 5/1996 |
| JP | 9-149248 | 6/1997 |
| JP | 11-215382 | 8/1999 |
| JP | 2001-169120 | 6/2001 |
| JP | 2001-186356 | 7/2001 |
| JP | 2002-158855 | 5/2002 |
| JP | 2002-218194 | 8/2002 |
| JP | 2002-300407 | 10/2002 |
| JP | 2002-321406 | 11/2002 |

OTHER PUBLICATIONS

Notice of Reason for Refusal issued Jan. 30, 2007 in corresponding Japanese Patent Application No. 2002-339741.

Notice of Reason for Refusal issued May 1, 2007 in corresponding Japanese Patent Application No. 2002-321406.

Notice of Reason for Refusal issued Jul. 21, 2009 in Japanese Patent Application No. 2007-240209, divisional application of corresponding Japanese Patent Application No. 2002-321406.

Decision of Reason for Refusal issued Jun. 1, 2010 in Japanese Application No. 2007-240209, the divisional application of corresponding Japanese Patent Application No. 2002-321406 and English translation thereof.

* cited by examiner

IMAGE PROCESSING DEVICE, IMAGE PROCESSING METHOD, IMAGE PROCESSING PROGRAM AND COMPUTER-READABLE RECORDING MEDIUM ON WHICH THE PROGRAM IS RECORDED

CROSS REFERENCE TO RELATED APPLICATIONS

This application is a divisional of application Ser. No. 10/699,700, filed on Nov. 4, 2003, which claims priority to Japanese Application No. 2002-321406, filed on Nov. 5, 2002, and Japanese Application No. 2002-339741, filed on Nov. 22, 2002, the specifications of which are incorporated herein by reference in their entireties for all purposes.

BACKGROUND OF THE INVENTION

1. Field of the Invention

This invention relates to an image processing device, and more particularly to an image processing device which extracts character, graphic and photograph regions from image data acquired by reading an original document and performs image processing for the regions and then re-synthesizes them to prepare a document image file.

2. Description of Related Art

Image data read by unit of a scanner or a like device has a great volume and hence is not suitable for storage or for transmission/reception directly as it is. Therefore, a suitable image process such as compression is performed for the image data in accordance with the type of the image. However, in image data acquired by reading an original document, character regions including character images, graphic regions formed from graphic images and photograph regions formed from photographs are included in a mixed state. Therefore, there is a problem that, if compression suitable for the photograph regions is applied to the image data, then this makes it less easy to read the characters although the volume decreases, but if compression suitable for the character regions is applied, then a sufficiently high compression ratio cannot be achieved. Thus, some known image processing device extracts character, graphic and photograph regions separately from one another from image data of an original document and applies different compressions suitable for the individual regions and then re-synthesizes them to prepare a document image file. According to the image processing device just descried, an image file can be prepared with a sufficiently reduced volume while an image quality is maintained (refer to, for example, Japanese Patent Laid-Open No. 2001-169120).

However, depending upon the object of use of the image processing device, various cases are possible. In particular, it is desired to give a preference to the processing speed even if the volume or the picture quality of an image file to be outputted is sacrificed. Or, it is desired to give a preference to the picture quality even if the volume or the processing speed is sacrificed. Or else, it is desired to reduce the volume even if the picture quality or the processing speed is sacrificed. However, an image processing device is not available as yet which can automatically execute a compression process which satisfies any of the demands of users. Also an image processing device is not available as yet with which a user can arbitrarily designate a compression processing method to be applied to each of extracted regions.

Further, in the image processing device described above, if data of a specific region is processed by a default compression method, that is, a compression method suitable for the region, then the image size after the compression process of data of a region whose image size is smaller than a predetermined value sometimes becomes greater than that before the compression process. In order to solve the problem, several methods are available. According to one of the methods, compression processing is performed using a plurality of compression methods and one of resulting data which exhibits a minimum image size is adopted (refer to, for example, Japanese Patent Laid-Open No. Hei 11-215382). According to another one of the methods, compression processing is not performed for a region with which the phenomenon described above occurs (refer to, for example, Japanese Patent Laid-Open No. Hei 9-149248). However, the former method has a problem in that it involves complicated processing because it is necessary to perform compression processing for all regions individually using a plurality of compression methods. Meanwhile, the latter method has a problem in that the compression ratio of the image file as a whole is low because compression processing is not performed for a particular region.

SUMMARY OF THE INVENTION

It is an object of the present invention to provide an image processing device wherein, while character, graphic and photograph regions are extracted from image data acquired by reading an original document and undergo image processing and then are re-synthesized to prepare a document image file, a suitable compression process can be applied to data of each region automatically in accordance with a demand of a user regarding to which one of the speed, picture quality and volume a preference should be given.

It is another object of the present invention to provide an image processing device of the type just mentioned wherein a method of a compression process to be applied to data of each region can be designated arbitrarily by a user.

It is a further object of the present invention to provide an image processing device of the type mentioned wherein, even where application of a compression process to data of a specific region using a compression method suitable for the region gives rise to some increase of the image size after the compression process of data of another region whose image size is smaller than a predetermined value with respect to the image size before the compression process, image deterioration and drop of the processing speed can be suppressed to the minimum thereby to obtain an image of a high compression ratio.

The objects of the present invention described above are achieved by the following means.

(1) An image processing device, comprising: a region extraction unit for separating and extracting a character region, a graphic region and a photograph region from image data; a region compression unit for performing a compression process for each of the region data extracted by said region extraction unit; a region synthesis unit for synthesizing the region data compressed by said region compression unit; and a compression method selection unit for selecting a compression method of the compression process to be performed for each of the region data extracted by said region extraction unit from among a plurality of compression methods designated individually for types of the region data; said region compression unit performing the compression process for each of the region data using the compression method selected for the region data by said compression method selection unit.

(2) An image processing device, comprising: a region extraction unit for separating and extracting a character region, a graphic region and a photograph region from image data; a region compression unit for performing a compression process for each of the region data extracted by said region extraction unit; a region synthesis unit for synthesizing the region data compressed by said region compression unit; and a compression process mode setting unit for setting a speed preference mode as a compression process mode; said region compression unit using, when the speed preference mode is set by said compression process mode setting unit, one of a plurality of compression methods designated for each of the region data which exhibits the highest processing speed to perform the compression process for the individual region data.

(3) An image processing device, comprising: a region extraction unit for separating and extracting a character region, a graphic region and a photograph region from image data; a region compression unit for performing a compression process for each of the region data extracted by said region extraction unit; a region synthesis unit for synthesizing the region data compressed by said region compression unit; and a compression process mode setting unit for setting a picture quality preference mode as a compression processing mode; said region compression unit using, when the picture quality preference mode is set by said compression process mode setting unit, one of a plurality of compression methods designated for each of the region data which exhibits the least picture quality deterioration to perform the compression process for the individual region data.

(4) An image processing device, comprising: a region extraction unit for separating and extracting a character region, a graphic region and a photograph region from image data; a region compression unit for performing a compression process for each of the region data extracted by said region extraction unit; region synthesis unit for synthesizing the region data compressed by said region compression unit; and a compression process mode setting unit for setting a size preference mode as a compression processing mode; said region compression unit using, when the size preference mode is set by said compression process mode setting unit, one of a plurality of compression methods designated for each of the region data which exhibits the highest compression ratio to perform the compression process for the individual region data.

(5) An image processing device, comprising: a region extraction unit for separating and extracting a character region, a graphic region and a photograph region from image data; a region compression unit for performing a compression process for each of the region data extracted by said region extraction unit; a region synthesis unit for synthesizing the region data compressed by said region compression unit; and a compression process mode setting unit for setting a speed preference mode, a picture quality preference mode or a size preference mode as a compression processing mode; said region compression unit using, when the speed preference mode is set by said compression process mode setting unit, one of a plurality of compression methods designated for each of the region data which exhibits the highest processing speed to perform the compression process for the individual region data, said region compression unit using, when the picture quality preference mode is set by said compression process mode setting unit, one of a plurality of compression methods designated for each of the region data which exhibits the least picture quality deterioration to perform the compression process for the individual region data, and said region compression unit using, when the size preference mode is set by said compression process mode setting unit, one of a plurality of compression methods designated for each of the region data which exhibits the highest compression ratio to perform the compression process for the individual region data.

(6) An image processing device, comprising: a object extraction unit for interpreting a document file described in a page description language, and extracting a object which is a component of the document file, a object compression unit for performing a compression process for each of the object data extracted by said object extraction unit; a object synthesis unit for synthesizing the object data compressed by said object compression unit; and a compression method selection unit for selecting a compression method of the compression process to be performed for each of the object data extracted by said object extraction unit from among a plurality of compression methods designated individually for types of the object data; said object compression unit performing the compression process for each of the object data using the compression method selected for the object data by said compression method selection unit.

(7) An image processing method, comprising: a region extraction step of separating and extracting a character region, a graphic region and a photograph region from image data; a region compression step of performing a compression process for each of the region data extracted by said region extraction step; a region synthesis step of synthesizing the region data compressed by said region compression step; and a compression method selection step of selecting a compression method of the compression process to be performed for each of the region data extracted by said region extraction step from among a plurality of compression methods designated individually for types of the region data; said region compression step performing the compression process for each of the region data using the compression method selected for the region data by said compress ion method selection step.

(8) An image processing method, comprising: a region extraction step of separating and extracting a character region, a graphic region and a photograph region from image data; a region compression step of performing a compression process for each of the region data extracted by said region extraction step; a region synthesis step of synthesizing the region data compressed by said region compression step; and a compression process mode setting step of setting a speed preference mode as a compression process mode; said region compression step using, when the speed preference mode is set by said compression process mode setting step, one of a plurality of compression methods designated for each of the region data which exhibits the highest processing speed to perform the compression process for the individual region data.

(9) An image processing method, comprising: a region extraction step of separating and extracting a character region, a graphic region and a photograph region from image data; a region compression step of performing a compression process for each of the region data extracted by said region extraction step; a region synthesis step of synthesizing the region data compressed by said region compression step; and a compression process mode setting step of setting a picture quality preference mode as a compression processing mode; said region compression step using, when the picture quality preference mode is set by said compression process mode setting step, one of a plurality of compression methods designated for each of the region data which exhibits the least picture quality deterioration to perform the compression process for the individual region data.

(10) An image processing method, comprising: a region extraction step of separating and extracting a character region, a graphic region and a photograph region from image data; a region compression step of performing a compression process for each of the region data extracted by said region extraction step; a region synthesis step of synthesizing the region data compressed by said region compression step; and a compression process mode setting step of setting a size preference mode as a compression processing mode; said region compression step using, when the size preference mode is set by said compression process mode setting step, one of a plurality of compression methods designated for each of the region data which exhibits the highest compression ratio to perform the compression process for the individual region data.

(11) An image processing method, comprising: a region extraction step of separating and extracting a character region, a graphic region and a photograph region from image data; a region compression step of performing a compression process for each of the region data extracted by said region extraction step; a region synthesis step of synthesizing the region data compressed by said region compression step; and a compression process mode setting step of setting a speed preference mode, a picture quality preference mode or a size preference mode as a compression processing mode; said region compression step using, when the speed preference mode is set by said compression process mode setting step, one of a plurality of compression methods designated for each of the region data which exhibits the highest processing speed to perform the compression process for the individual region data, said region compression step using, when the picture quality preference mode is set by said compression process mode setting step, one of a plurality of compression methods designated for each of the region data which exhibits the least picture quality deterioration to perform the compression process for the individual region data, and said region compression step using, when the size preference mode is set by said compression process mode setting step, one of a plurality of compression methods designated for each of the region data which exhibits the highest compression ratio to perform the compression process for the individual region data.

(12) An image processing program for causing an image processing device to execute: a region extraction step of separating and extracting a character region, a graphic region and a photograph region from image data; a region compression step of performing a compression process for each of the region data extracted by said region extraction step; a region synthesis step of synthesizing the region data compressed by said region compression step; and a compression method selection step of selecting a compression method of the compression process to be performed for each of the region data extracted by said region extraction step from among a plurality of compression methods designated individually for types of the region data; said region compression step performing the compression process for each of the region data using the compression method selected for the region data by said compression method selection step.

(13) An image processing program for causing an image processing device to execute: a region extraction step of separating and extracting a character region, a graphic region and a photograph region from image data; a region compression step of performing a compression process for each of the region data extracted by said region extraction step; a region synthesis step of synthesizing the region data compressed by said region compression step; and a compression process mode setting step of setting a speed preference mode as a compression processing mode; said region compression step using, when the speed preference mode is set by said compression process mode setting step, one of a plurality of compression methods designated for each of the region data which exhibits the highest processing speed to perform the compression process for the individual region data.

(14) An image processing program for causing an image processing device to execute: a region extraction step of separating and extracting a character region, a graphic region and a photograph region from image data; a region compression step of performing a compression process for each of the region data extracted by said region extraction step; a region synthesis step of synthesizing the region data compressed by said region compression step; and a compression process mode setting step of setting a picture quality preference mode as a compression processing mode; said region compression step using, when the picture quality preference mode is set by said compression process mode setting step, one of a plurality of compression methods designated for each of the region data which exhibits the least picture quality deterioration to perform the compression process for the individual region data.

(15) An image processing program for causing an image processing device to execute: a region extraction step of separating and extracting a character region, a graphic region and a photograph region from image data; a region compression step of performing a compression process for each of the region data extracted by said region extraction step; a region synthesis step of synthesizing the region data compressed by said region compression step; and a compression process mode setting step of setting a size preference mode as a compression processing mode; said region compression step using, when the size preference mode is set by said compression process mode setting step, one of a plurality of compression methods designated for each of the region data which exhibits the highest compression ratio to perform the compression process for the individual region data.

(16) An image processing program for causing an image processing device to execute: a region extraction step of separating and extracting a character region, a graphic region and a photograph region from image data; a region compression step of performing a compression process for each of the region data extracted by said region extraction step; a region synthesis step of synthesizing the region data compressed by said region compression step; and a compression process mode setting step of setting a speed preference mode, a picture quality preference mode or a size preference mode as a compression processing mode; said region compression step using, when the speed preference mode is set by said compression process mode setting step, one of a plurality of compression methods designated for each of the region data which exhibits the highest processing speed to perform the compression process for the individual region data, said region compression step using, when the picture quality preference mode is set by said compression process mode setting step, one of a plurality of compression methods designated for each of the region data which exhibits the least picture quality deterioration to perform the compression process for the individual region data, and said region compression step using, when the size preference mode is set by said compression process mode setting step, one of a plurality of compression methods designated for each of the region data which exhibits the highest compression ratio to perform the compression process for the individual region data.

(17) A computer-readable recording medium on which the image processing program according to (16) is recorded.

(18) An image processing device, comprising: a region extraction unit for separating and extracting a character region, a graphic region and a photograph region from image data; a region compression unit for performing a compression process for each of the region data extracted by said region extraction unit; a region synthesis unit for synthesizing the region data compressed by said region compression unit; and an image size calculation unit for calculating an image size of specific region data extracted by said region extraction unit; said region compression unit using, when the image size of the specific region data calculated by said image size calculation unit is equal to or greater than a threshold value, a first compression method to perform the compression process for the specific region data, and said region compression unit using, when the image size of the specific region data calculated by said image size calculation unit is smaller than the threshold value, a second compression method to perform the compression process for the specific region data.

(19) An image processing device, comprising: a object extraction unit for interpreting a document file described in a page description language, and extracting a object which is a component of the document file, a object compression unit for performing a compression process for each of the object data extracted by said object extraction unit; a object synthesis unit for synthesizing the object data compressed by said object compression unit; an image size calculation unit for calculating an image size of the object data extracted by said object extraction unit; and a compression method selection unit for selecting a compression method of the compression process to be performed for each of the object data extracted by said object extraction unit in proportion to the image size of the object data calculated by said image size calculation unit from among a plurality of designated compression methods; said object compression unit performing the compression process for each of the object data using the compression method selected for the object data by said compression method selection unit.

(20). An image processing method, comprising: a region extraction step of separating and extracting a character region, a graphic region and a photograph region from image data; a region compression step of performing a compression process for each of the region data extracted by said region extraction step; a region synthesis step of synthesizing the region data compressed by said region compression step; and an image size calculation step of calculating an image size of specific region data extracted by said region extraction step; said region compression step using, when the image size of the specific region data calculated by said image size calculation step is equal to or greater than a threshold value, a first compression method to perform the compression process for the specific region data, and said region compression step using, when the image size of the specific region data calculated by said image size calculation step is smaller than the threshold value, a second compression method to perform the compression process for the specific region data.

(21) An image processing method, comprising: a character region extraction step of separating and extracting character regions from image data; an image size calculation step of calculating an image size of each of the character region data extracted by said character region extraction step; a compression method selection step of selecting, when the image size of each of the character region data calculated by said image size calculation step is equal to or greater than a threshold value, the MMR compression as a compression method but selecting, when the image size of each of the character region data calculated by said image size calculation step is smaller than the threshold value, the Flate compression as a compression method; and a region compression step of performing a compression process for each of the character region data using the compression method selected by said compression method selection step.

(22) An image processing program for causing an image processing device to execute: a region extraction step of separating and extracting a character region, a graphic region and a photograph region from image data; a region compression step of performing a compression process for each of the region data extracted by said region extraction step; a region synthesis step of synthesizing the region data compressed by said region compression step; and an image size calculation step of calculating an image size of specific region data extracted by said region extraction step; said region compression step using, when the image size of the specific region data calculated by said image size calculation step is equal to or greater than a threshold value, a first compression method to perform the compression process for the specific region data, and said region compression step using, when the image size of the specific region data calculated by said image size calculation step is smaller than the threshold value, a second compression method to perform the compression process for the specific region data.

(23) The computer-readable recording medium on which the image processing program according to (22) is recorded.

(24) An image processing program for causing an image processing device to execute: a character region extraction step of separating and extracting character regions from image data; an image size calculation step of calculating an image size of each of the character region data extracted by said character region extraction step; a compression method selection step of selecting, when the image size of each of the character region data calculated by said image size calculation step is equal to or greater than a threshold value, the MMR compression as a compression method but selecting, when the image size of each of the character region data calculated by said image size calculation step is smaller than the threshold value, the Flate compression as a compression method; and a region compression step of performing a compression process for each of the character region data using the compression method selected by said compression method selection step.

(25) The computer-readable recording medium on which the image processing program according to (24) is recorded.

BRIEF DESCRIPTION OF THE DRAWINGS

FIG. 3 is a schematic view illustrating a concept of an example of an image process by the image processing device 1a;

FIG. 4 is a flowchart illustrating a procedure of the image process of the image processing device 1a;

FIG. 5 is a schematic view showing an example of a setting screen for a compression process displayed on an operation panel of an operation section 103 of the image processing device 1a;

FIG. 6 is a flowchart illustrating a procedure of a character region process of the image processing device 1a;

FIG. 7 is a flow chart illustrating a procedure of a graphic region process of the image processing device 1a;

FIG. 8 is a flow chart illustrating a procedure of a photograph region process of the image processing device 1a;

DESCRIPTION OF THE PREFERRED EMBODIMENTS

In the following, embodiments of the present invention are described in detail with reference to the drawings.

Figure 1:
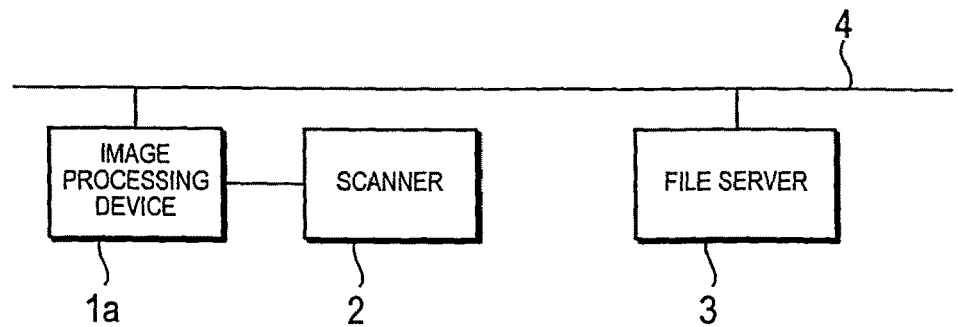
FIG. 1 is a block diagram showing a general configuration of an image processing system including an image processing device according to a first embodiment of the present invention.

FIG. 1 is a block diagram showing a general configuration of an image processing system including an image processing device according to a first embodiment of the present invention. Referring to FIG. 1, the image processing system shown includes an image processing device 1a, a scanner 2 serving as an image inputting source device, and a file server 3 serving as an image outputting destination device. The components of the image processing system just mentioned are connected for mutual communication through a computer network 4. It is to be noted that the types and the numbers of such device to be connected to the computer network 4 are not limited to those shown in FIG. 1.

Figure 2:
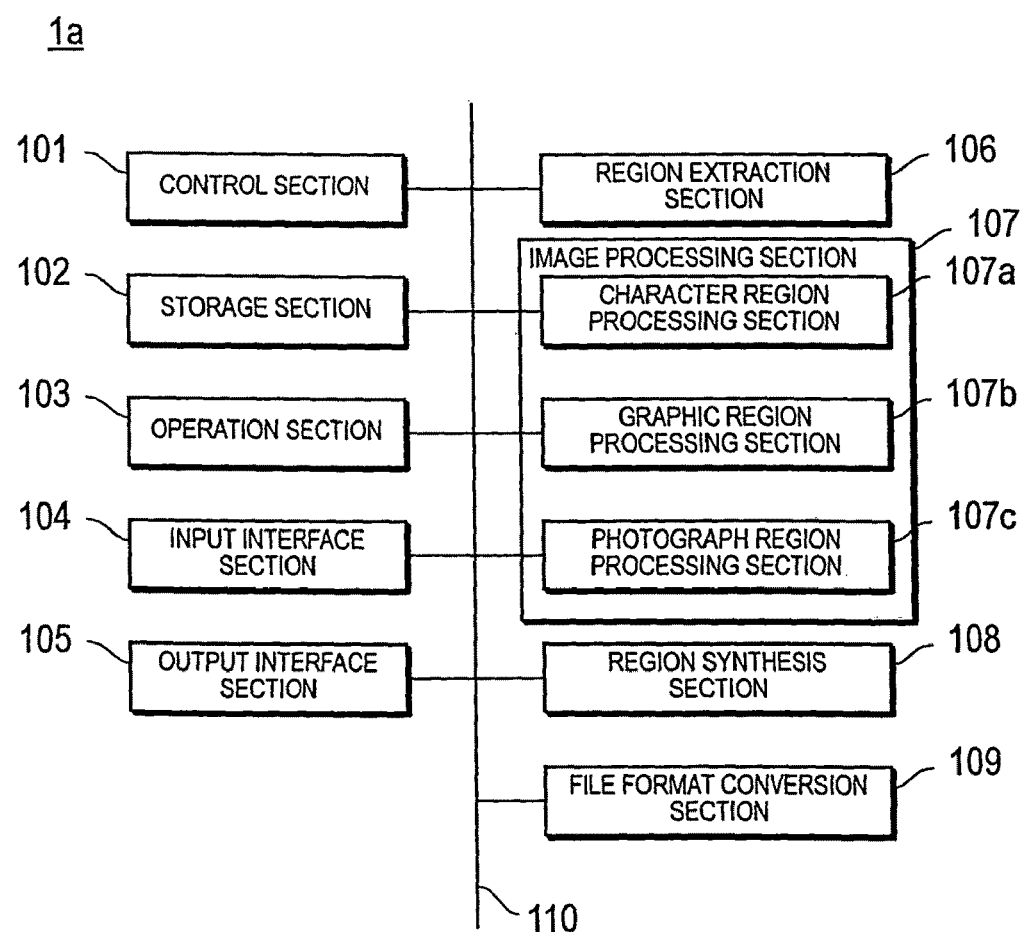
FIG. 2 is a block diagram showing a configuration of the image processing device 1a shown in FIG. 1.

FIG. 2 is a block diagram showing a configuration of the image processing device 1a according to the present embodiment. Referring to FIG. 2, the image processing device 1a includes a control section 101, a storage section 102, an operation section 103, an input interface section 104, an output interface section 105, a region extraction section 106, an image processing section 107, a region synthesis section 108 and a file format conversion section 109. The components mentioned of the image processing device 1a are connected to one another by a bus 110 for delivering signals therealong.

The control section 101 is a CPU and performs control of the components described, various arithmetic operation processes and other necessary processes in accordance with a program. The storage section 102 includes a ROM for storing various programs and parameters in advance, a RAM serving as a working area for storing a program or data, a hard disk used to store various programs and parameters and temporarily store image data and other necessary data obtained by image processing, and some other necessary devices.

The operation section 103 includes keys, an operation panel and so forth used to set an output region, a type of an image process, a color mode, a format of an output file, a transmission destination and so forth and issue an instruction to start an operation and so forth. Here, the setting of an output region is performed by selecting whether some or all of extracted character, graphic and photograph regions should be outputted. The setting of a type of an image process is performed by selecting whether or not some of binarization, color subtraction, resolution conversion, smoothing, compression and other processes should be performed as a type of an image process to be performed for an extracted region. Thereupon, for the compression process, a compression method to be performed for data of each region is selected as hereinafter described. The setting of a color mode is performed by selecting a color mode or a monochrome mode and a gray scale of an output file. The setting of a format of an output file is performed by selecting one of file formats for an output file. It is to be noted that, as a format for an output file, document formats of various types of document preparation software and formats for universal use such as the Postscript® and the PDF can be applied. The setting of a transmission destination is performed by inputting an IP address, a host computer name, a mail address and other necessary information of an device of an image outputting destination.

The input interface section 104 is an interface for receiving an input of image data from an external image inputting source device. The output interface section 105 is an interface for transmitting an output file to an external image outputting destination device.

The region extraction section 106 performs a process of separating and extracting character regions, graphic regions and photograph regions from input image data. The image processing section 107 includes a character region processing section 107a, a graphic region processing section 107b and a photograph region processing section 107c, and performs appropriate image processes for individual region data of the extracted character, graphic and photograph regions. The region synthesis section 108 synthesizes the character, graphic and photograph data after the image processes to prepare composite image data of an internal file format. The file format conversion section 109 converts the produced composite image data of the internal file format into composite image data of a set output file format.

The scanner 2 reads an original document to acquire image data and transmits the acquired image data to the image processing device.

The file server 3 is a computer, and stores a file received through the computer network and transfers the stored file to another device on the computer network in response to a transfer request.

The computer network 4 is formed from a LAN in which a computer and peripheral equipment, network device and so forth are connected in accordance with the specifications of the Ethernet®, Token Ring, FDDI or the like, or a WAN wherein LANs are interconnected by a dedicated line, or the like.

Figure 3:
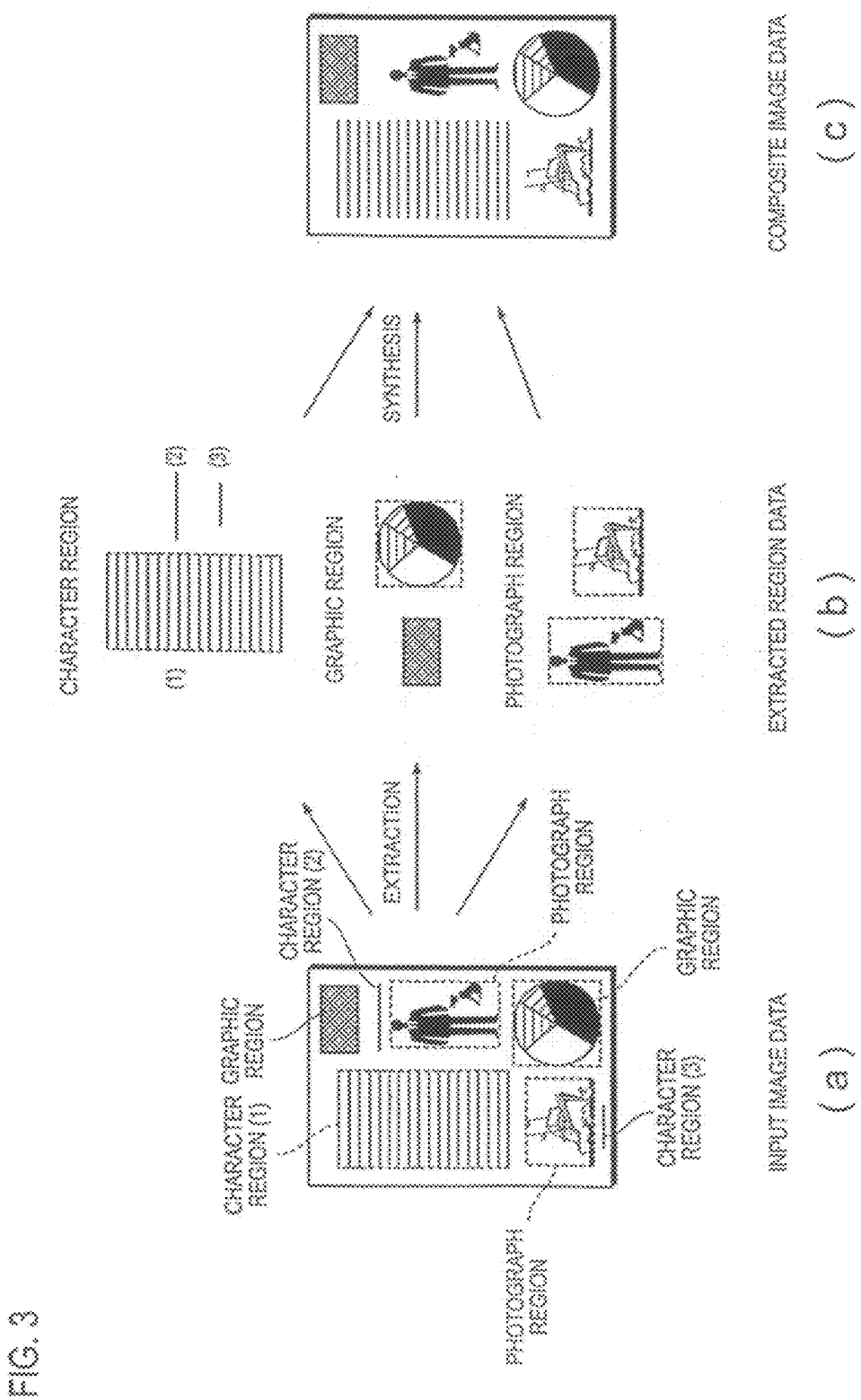

Now, an outline of image processing executed by the image processing device 1a according to the present invention is described. FIG. 3 is a view illustrating a concept of an example of image processing by the image processing device 1a. As shown in (a) of FIG. 3, input image data obtained by reading in an original document from the scanner 2 includes a character region or regions each including a character image, a graphic region or regions each including a graphic image and a photograph region or regions each including a photograph image. When it is intended to compress such image data of a great volume to reduce the volume and store the image data of the reduced volume into the file server 3, if the entire image data is compressed uniformly as it is, then where compression suitable for a photograph region is performed, although the volume decreases, it becomes less easy to read the characters because of deterioration of the image. However, if compression suitable for a character region is applied, then a sufficiently high compression ratio cannot be achieved. Therefore, the image processing device 1a separates and extracts character regions, graphic regions and photograph regions from input image data received from the scanner 2 ((b) of FIG. 3). Then, the image processing device 1a performs suitable compression processes suitable for the types of the regions for the extracted region data and re-synthesizes the compressed region data to prepare composite image data ((c) of FIG. 3). Thereafter, the image processing device 1a converts the composite image data into composite image data of a predetermined file format and transmits the converted data to the file server 3.

Figure 4:
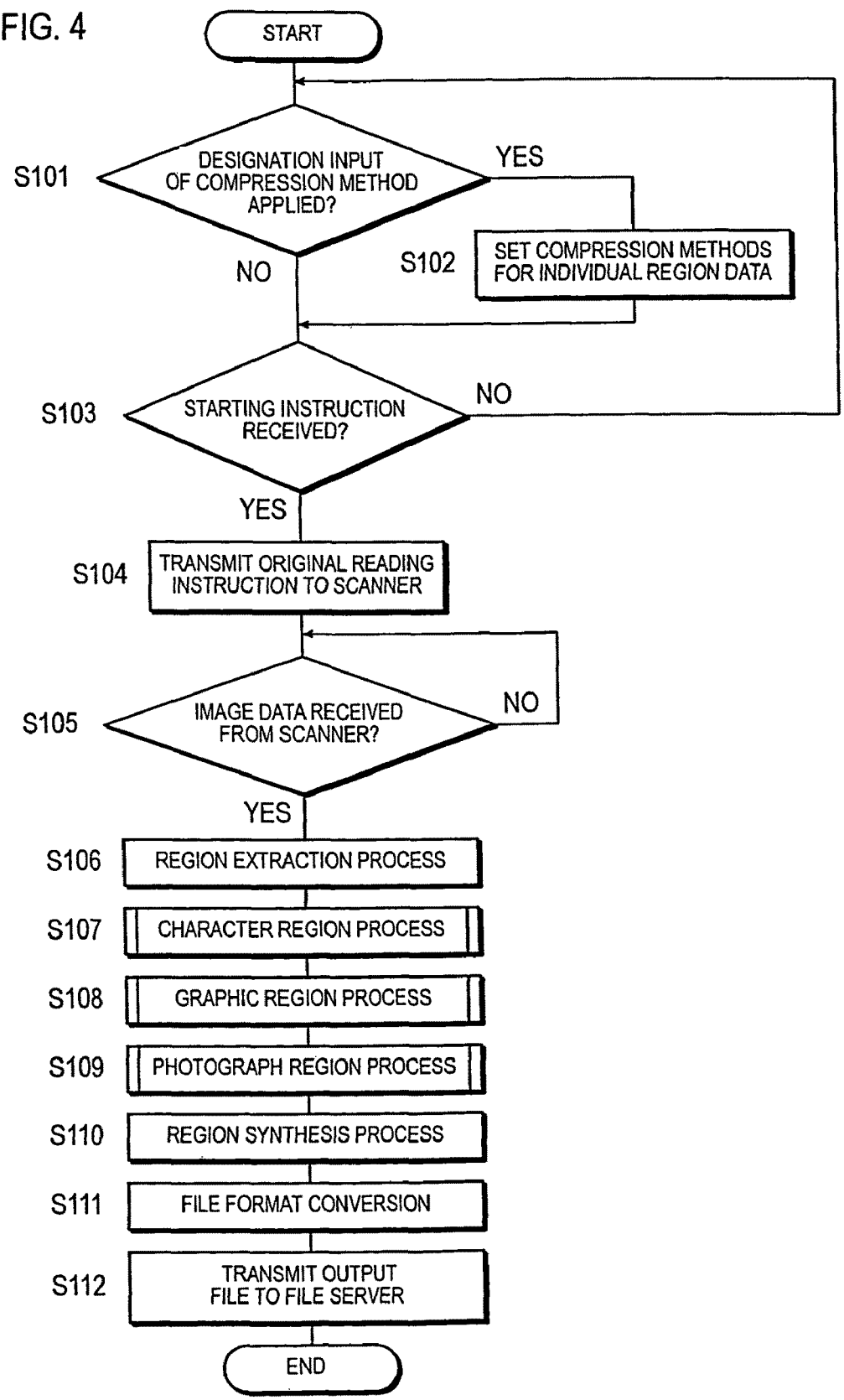
Figure 5:
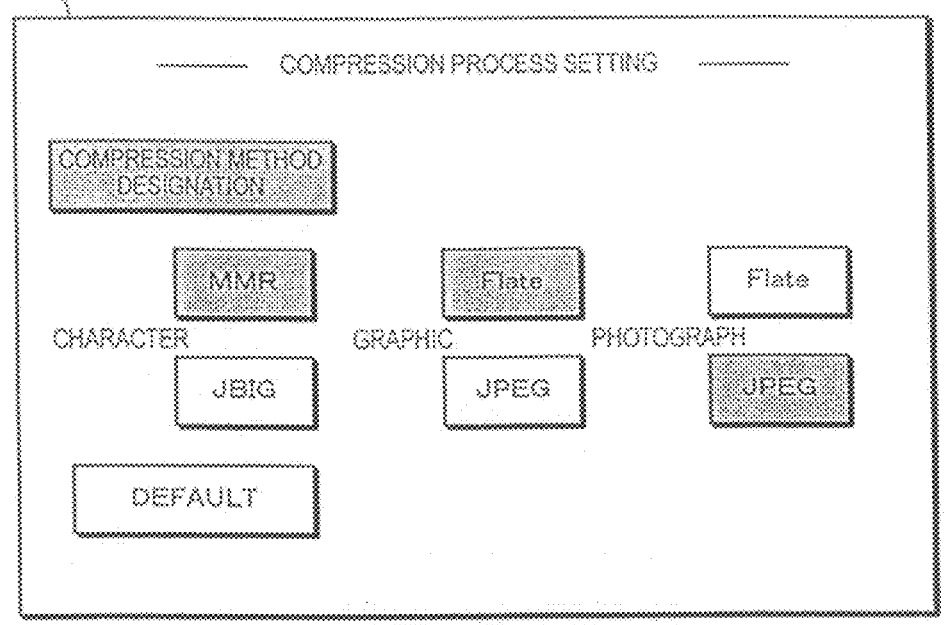

Now, an outline of operation of the entire image processing system according to the present embodiment is described. FIG. 4 is a flow chart illustrating a procedure of image processing of the image processing device 1a according to the present embodiment. Referring to FIG. 4, if a designation input of a compression method for a compression process to be applied to region data of each of character regions, graphic regions and photograph regions to be extracted is received (YES at step S101), then the image processing device 1a sets compression methods to be applied to the individual region data in accordance with the input (S102). Then, the image processing device 1a waits until an image process starting instruction is received (NO at step S103). FIG. 5 is a view showing an example of a compression process setting screen 103a displayed on the operation panel of the operation section 103 of the image processing device 1a. Referring to FIG. 5, touch keys for "Compression method designation", "MMR", "JBIG", "Flate", "JPEG", "Default" and so forth are displayed on the compression process setting screen 103a. When the user wants to designate compression methods for compression processes to be applied to the individual region data, it will first depress the "Compression method designation" key, and then depress, for each of the character, graphic and photograph regions, a desired compression method key to designate the compression methods individually for the region data.

Here, the compression method is a type of a compression form (compression format) to be used for a compression process for each region data. In the present embodiment, the MMR compression or the JBIG compression can be designated for character region data while the Flate compression or the JPEG compression can be designated for graphic region data and photograph region data. The MMR compression and the JBIG compression are compression methods (both reversible compressions) suitable for an image which has many variation points such as a character image. The MMR compression has a characteristic that the compression speed is higher than that of the JBIG compression while the JBIG compression has another characteristic that it is superior in the picture quality and the compression ratio to the MMR compression. Meanwhile, the Flate compression and the JEPG compression are compression methods suitable for graphic and photograph images. Since the JPEG compression is irreversible compression, it has characteristics that the compression ratio is higher than that of the Flate compression which is reversible compression and that the compression speed is higher than that of the Flate compression. However, since the JPEG compression is irreversible compression, it has a further characteristic that it is inferior in the picture quality to the Flate compression and, although the picture quality deterioration is not noticeable with a natural image such as a photograph image, it is noticeable with a line drawing such as a graphic image. If the user designates desired compression methods for the individual region data taking the characteristics of the compression methods described above into consideration, then the arbitrary compression processes can be applied to the individual region data extracted from the input data. It is to be noted that, if a designation input of a compression method from the user is not received at step S101 (NO at step S101), then compression processes for the individual region data are performed using default compression methods as hereinafter described.

Referring back to FIG. 4, if the image processing device 1a thereafter accepts an input of a starting instruction through the operation section 103 from the user (YES at step S103), then it transmits an original reading instruction to the scanner 2 through the input interface section 104 (S104) and then waits until image data is received from the scanner 2 (NO at step S105). When an original reading instruction is received from the image processing device 1a, the scanner 2 reads an original document set at a predetermined position to acquire image data of the original document and transmits the acquired image data to the image processing device 1a.

The image processing device 1a receives the image data from the scanner 2 through the input interface section 104 (YES at step S105) and stores the received image data into the storage section 102. It is to be noted that the designation of compression processing methods described above may otherwise be performed after image data is received from the scanner. In this instance, the steps S101 to S103 described above are executed after the steps S104 to S106. Further, the image process starting instruction may be inputted from some other device on the communication network 4 or directly from the scanner 2. In this instance, the steps S104 and S105 described above are omitted.

Then, the image processing device 1a separates character regions, graphic regions and photograph regions from the input image data by unit of the region extraction section 106 to extract individual region data (S106). The method of extracting region data from input image data is not limited particularly, but a known method can be used. For example, the following methods can be used.

In particular, the region extraction section 106 is used to discriminate a character region or regions from input image data to extract character region data and stores the character region data into the storage section 102 together with position information of the character region or regions. As a method of discriminating a character region, for example, the following method can be used. In particular, a region in a circumscribed rectangle of an edge pixel group wherein the distance between edge pixels of edge image data obtained from image data is smaller than a predetermined pixel number is extracted. Then, based on a characteristic that a character region includes a lager number of oblique edge components in a small area, oblique edge components from among frequency components included in the region of the circumscribed rectangle are calculated as a characteristic amount. Then, a character region is discriminated based on the content of the oblique edge components.

Then, the region extraction section 106 now complements the extracted character regions with peripheral pixels to produce non-character image data from the input image data and stores the non-character image data into the storage section 102. Then, the region extraction section 106 discriminates a graphic region or regions from the non-character image data to extract graphic region data and stores the graphic region data into the storage section 102 together with position information of the graphic region or regions. As a method of discriminating a graphic region from non-characteristic image data, the following can be used. In particular, based on a characteristic that the brightness distribution in a graphic region is uniform to some degree while the brightness distribution in a photograph region exhibits a variance, a brightness histogram is produced for each line in two main and sub scanning directions with regard to all pixels in a region divided by an edge image from edge image data obtained from brightness image data to calculate a degree of dispersion in brightness to make a distinction between a graphic region and a photograph region.

Then, the region extraction section 106 complements the extracted graphic region or regions of the non-character image data with peripheral pixels, extracts photograph region data from the non-character image data and stores the photograph region data into the storage section 102 together with position information of the photograph region or regions.

Thereafter, the image processing device 1a uses the image processing section 107 to perform image processes suitable for the region types for the individual region data extracted at step S104 (steps S108 to S110).

Figure 6:
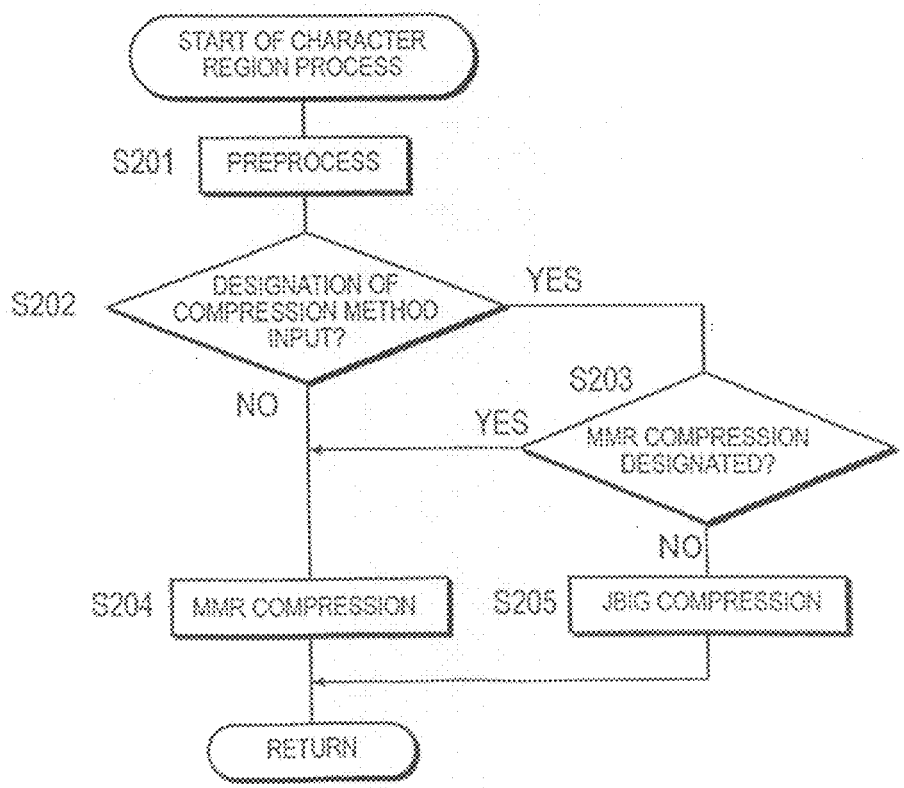

FIG. 6 is a flow chart illustrating a procedure of the character region process of the image processing device 1a according to the present embodiment. Referring to FIG. 6, the image processing device 1a reads out character region data from the storage section 102 and uses the character region processing section 107a to perform a preprocess for the character region data (S201). More particularly, the character region processing section 107a detects a character color for each of the extracted character region data and binarizes the character region data to convert the character region data into 1-bit data. Then, the character region processing section 107a performs a compression process for each of the character region data in accordance with the compression method for the character position data designated at step S101 (S202 to S205). In particular, if the MMR compression is designated for the character region data at step S101 (YES at step S202 and YES at step S203), then the MMR compression is performed for the character region data (S204). However, if the JBIG compression is designated (YES at step S202 and NO at step S203), then the JBIB compression is performed (S205). On the other hand, if no compression method is designated at step S101 (NO at step S202), then the MMR compression which is default compression is performed for the character region data (S204). Each of such character region data for which the compression process has been performed is stored into the storage section 102 together with color information, position information and other necessary information relating thereto.

Figure 7:
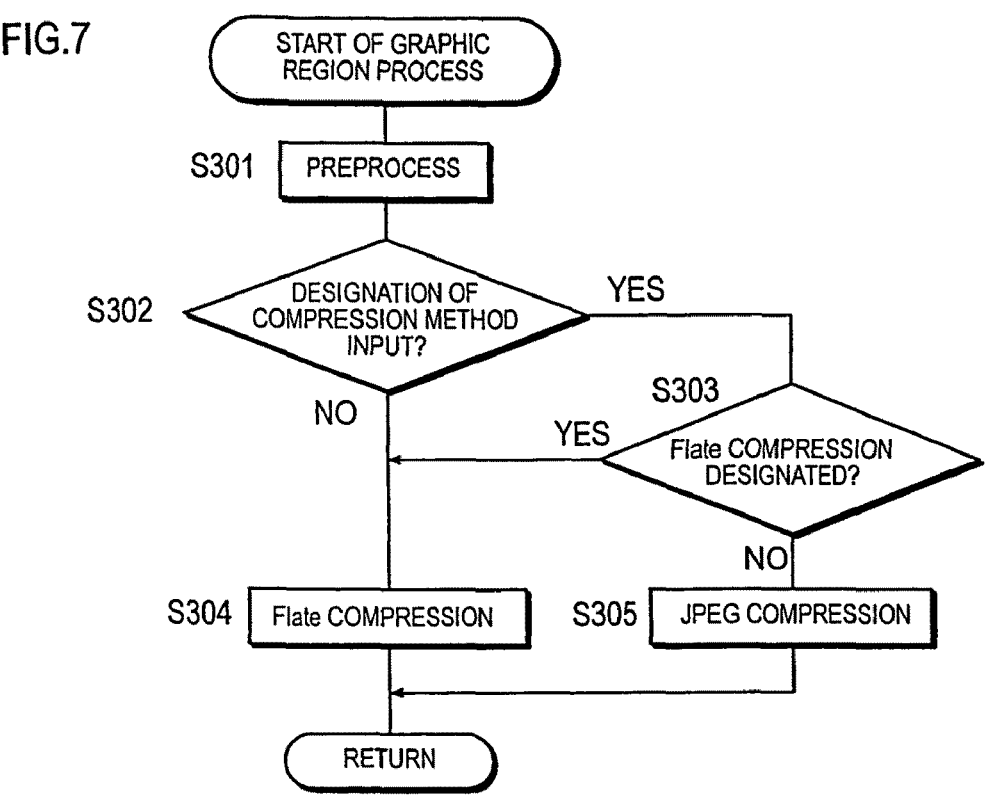

FIG. 7 is a flow chart illustrating a procedure of the graphic region process of the image processing device 1a according to the present embodiment. Referring to FIG. 7, the image processing device 1a reads out graphic data from the storage section 102 and uses the graphic region processing section 107b to perform a preprocess such as a resolution conversion process, a smoothing process and a primary color process for the graphic region data (S301). Then, if the Flate compression is designated for the graphic image data at step S101 (YES at step S302 and YES at step S303), then the Flate compression is performed for the graphic data (S304). However, if the JPEG compression is designated (YES at step S302 and NO at step S303), then the JPEG compression is performed for the graphic region data (S305). On the other hand, if no compression method is designated at step S101 (NO at step 302), then the Flate compression which is default compression is performed for the graphic region data (S304). Each of the graphic region data for which the compression process has been performed is stored into the storage section 102 together with position information and so forth relating thereto.

Figure 8:
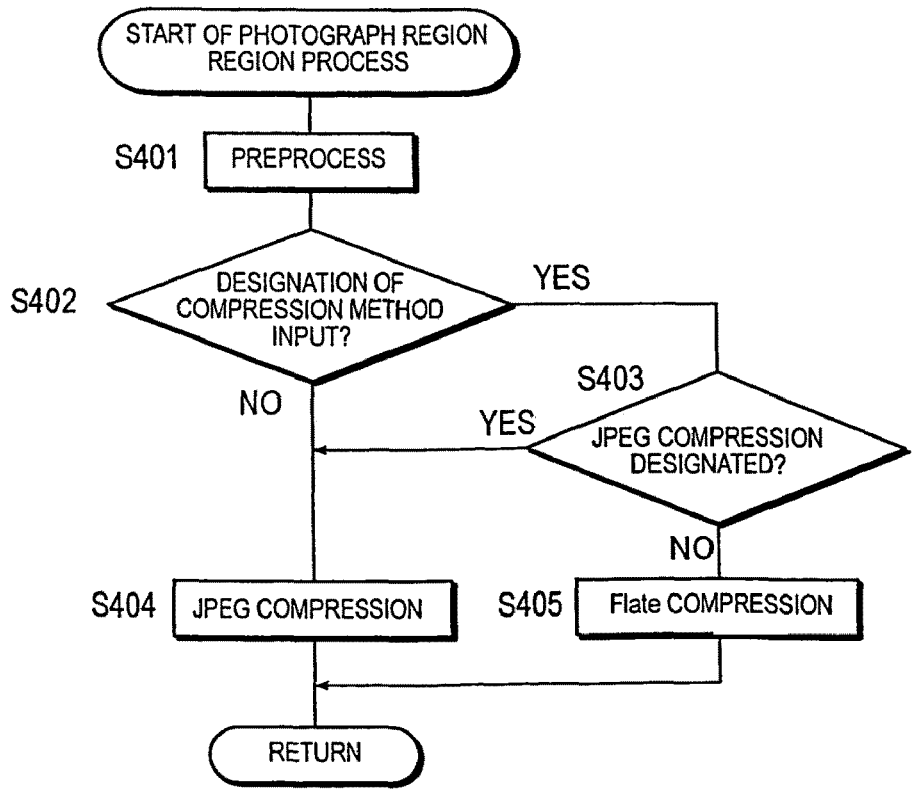

FIG. 8 is a flow chart illustrating a procedure of the photograph region process of the image processing device 1a according to the present embodiment. Referring to FIG. 8, the image processing device 1a reads out photograph region data from the storage section 102 and uses the photograph region processing section 107c to perform a preprocess such as a resolution conversion process and a smoothing process for the photograph region data (S401). Then, if the JPEG compression is designated for the photograph image data at step S101 (YES at step S402 and YES at step S403), then the JPEG compression is performed for the photograph region data (S404). However, if the Flate compression is designated (YES at step S402 and NO at step S403), then the Flate compression is performed for the photograph region data (S405). On the other hand, if no compression method is designated at step S101 (NO at step S402), then the JPEG compression which is default compression is performed for the photograph region data (S404). Each of the photograph region data for which the compression process has been performed is stored into the storage section 102 together with position information thereof and so forth.

It is to be noted that, in FIG. 4, the image processing device 1a may execute the character region process (S107), graphic region process (S108) and photograph region process (S109) in any order.

Thereafter, the image processing device 1a uses the region synthesis section 108 to synthesize the region data obtained by the image process described above based on the position information of them to acquire composite image data and stores the composite image data into the storage section 102 (S110). Further, the image processing device 1a uses the file format conversion section 109 to convert the composite image data into composite image data of the set output file format (S111) and transmits the resulting output file (document image file) to the file server 3 through the output interface section 105 and the computer network 4 (S112).

The file server 3 receives the output file from the image processing device 1a through the computer network 4 and stores the received file into a predetermined directory of the storage device such as a hard disk. Then, if a transfer request for the file is received from a different device on the computer network 4, then the image processing device 1a transfers the stored file to the different device through the computer network 4.

Figure 9:
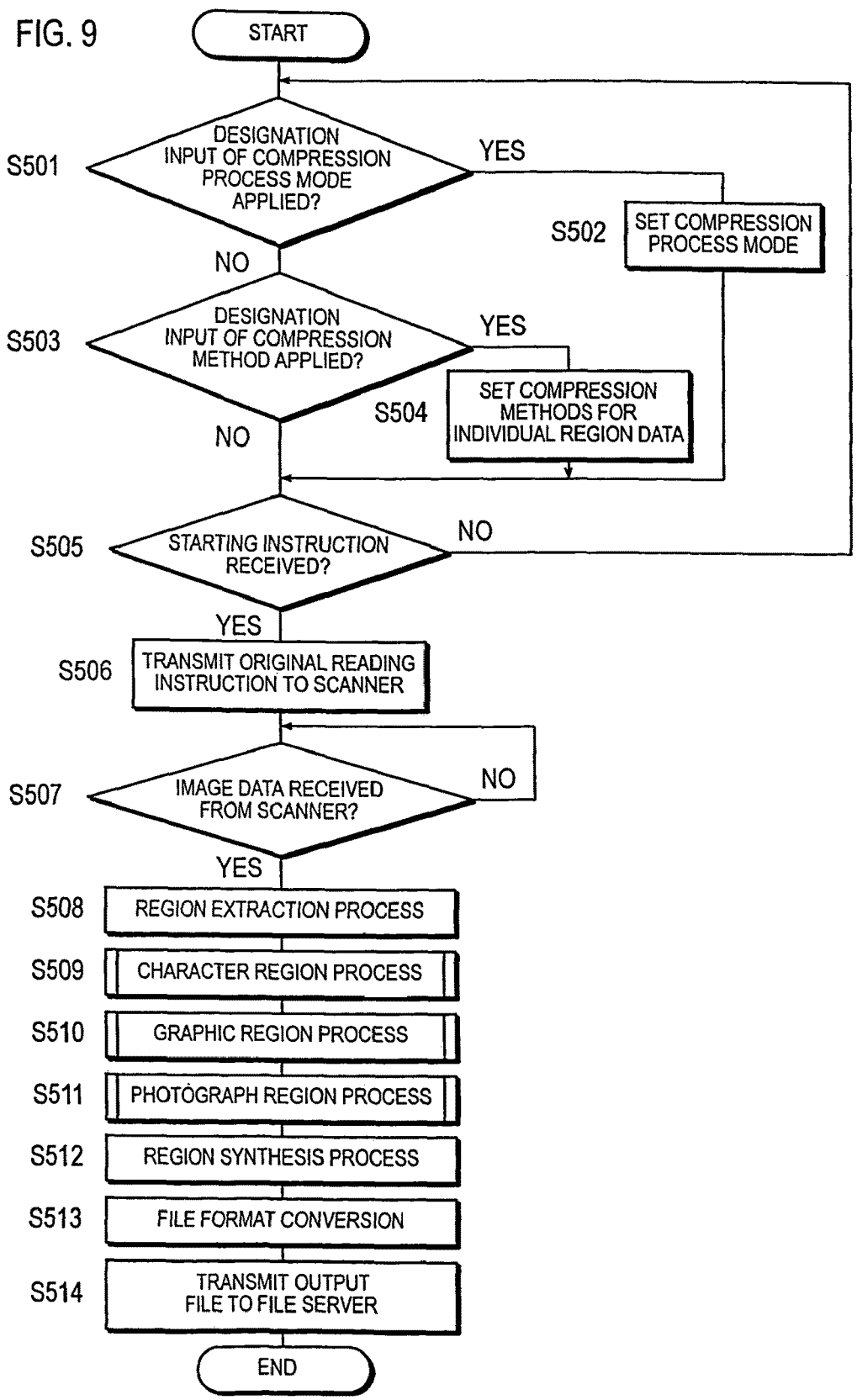
FIG. 9 is a flow chart illustrating a procedure of an image process of an image processing device 1b according to a second embodiment of the present invention.

Now, an image processing device according to a second embodiment of the present invention is described. FIG. 9 is a flow chart illustrating a procedure of an image process of the image processing device 1b according to the second embodiment of the present invention. In the present embodiment, the image processing device 1b has a configuration similar to that of the image processing device 1a according to the first embodiment described hereinabove and is connected to a scanner 2 and a file server 3 for mutual communication by a computer network 4 similarly to the image processing device 1a.

Figure 10:
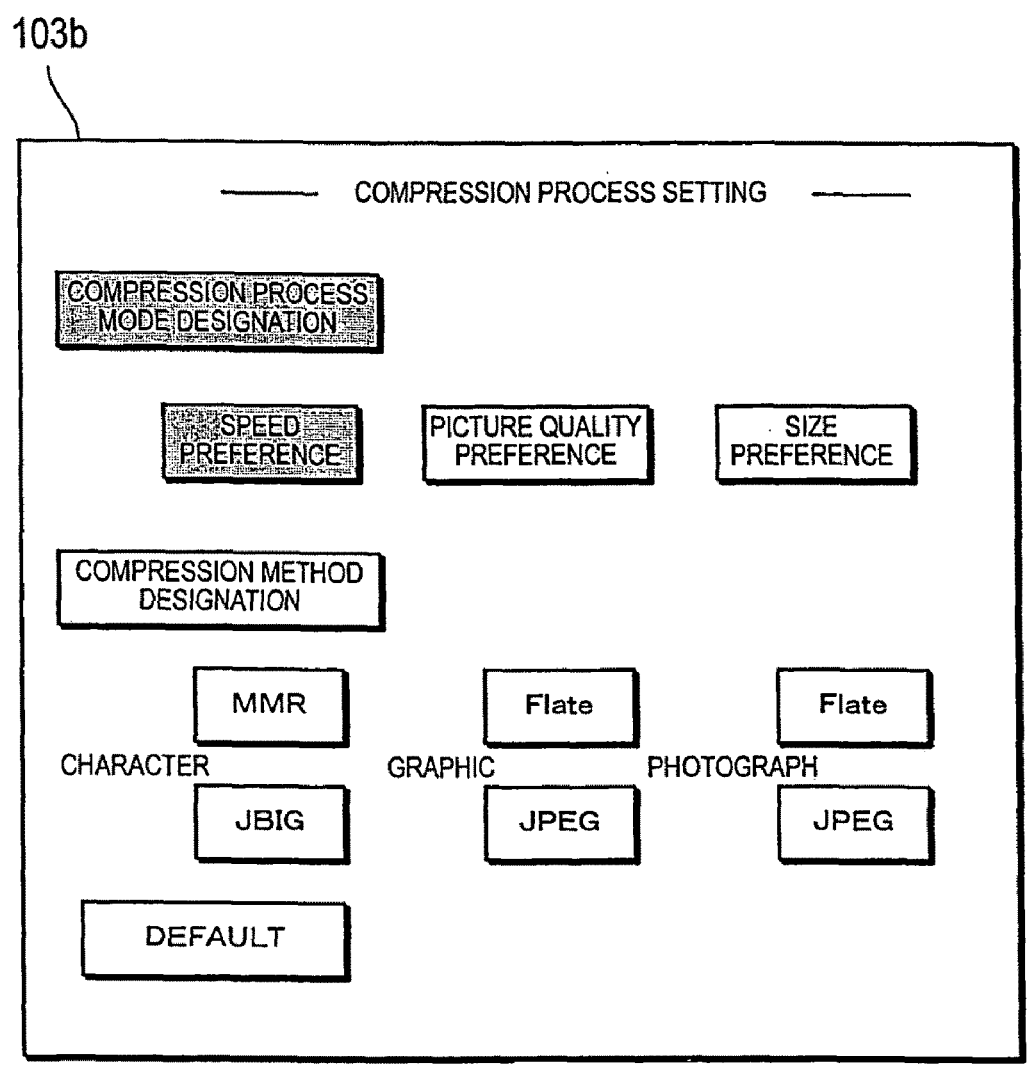
FIG. 10 is a schematic view showing an example of a setting screen for a compression process displayed on an operation panel of an operation section 103 of the image processing device 1b.

Referring to FIG. 9, if a designation input of a compression processing mode for compression processes to be performed for individual region data is received (YES at step S501), then the image processing device 1b sets a compression processing mode in accordance with the input (S502). Then, the image processing device 1a waits until an image process starting instruction is received (NO at step S505). FIG. 10 is a view showing an example of a compression process setting screen displayed on the operation panel of the operation section 103 of the image processing device 1b. Referring to FIG. 10, the compression process setting screen 103b additionally displays, when compared with the compression process setting screen 103a by the image processing device 1a of the first embodiment described hereinabove, "Compression processing mode designation" and "Speed preference", "Picture quality preference" and "Size preference" keys. When the user wants to designate a compression processing mode for a compression process to be performed for each region data, it will depress the "Compression processing mode designation" key and further depress a desired one of the compression processing mode keys to designate a mode of the key.

Here, the compression processing mode makes it possible to designate a factor which should be used preferentially when each of region data is to be compressed by designating a mode. In the present embodiment, the compression processing mode can be selectively designated from among a speed preference mode, a picture quality preference mode and a size preference mode. The speed preference mode is a mode in which a compression process is performed at the highest processing speed, and in the speed preference mode, each region data is compressed through application of a compression method which exhibits the highest processing speed. The picture quality preference mode is a mode in which image data obtained by a compression process exhibits the highest picture quality, and in the picture quality mode, each region data is compressed through application of a compression process which exhibits the least picture quality deterioration. The size preference mode is a mode in which image data obtained by a compression process exhibits the smallest size, and in the size preference mode, each region data is compressed through application of a compression method which exhibits the highest compression ratio. Consequently, even if the user does not have particular knowledge regarding a compression method to be performed for each region data, only if it designates the compression processing mode, then a desired compression process can be executed.

Referring back to FIG. 9, if a designation input of a compression method to be performed for each region data is received in place of a designation input of a compression processing mode for an image process (NO at step S501 and YES at step S503), then the image processing device 1b sets the compression methods to be performed for the individual region data in accordance with the input (S504). Then, the image processing device 1a waits until an image process starting instruction is received (NO at step S505).

Then, when an input of an image process starting instruction is accepted (YES at step S505), then the image processing device 1a transmits an original reading instruction to the scanner 2 (S506) and waits that it receives image data from the scanner 2 (S507). Then, the image processing device 1a extracts individual region data from the received input image data (S508) and then performs image processes suitable for the region types for the extracted region data (S509 to S511).

Figure 11:
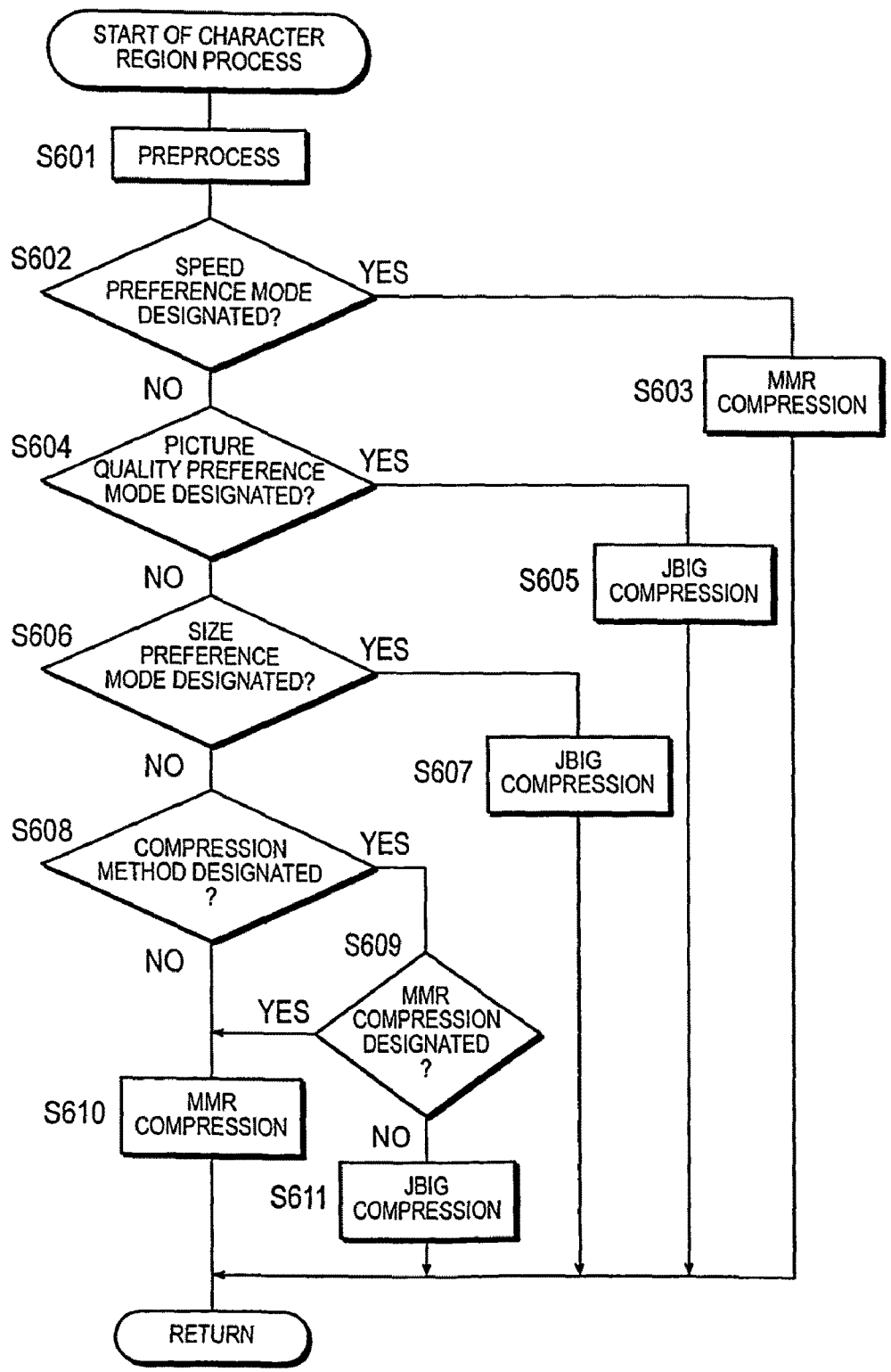
FIG. 11 is a flow chart illustrating a procedure of a character region process of the image processing device 1b.

FIG. 11 is a flow chart illustrating a procedure of the character region process of the image processing device 1b according to the present embodiment. Referring to FIG. 11, the image processing device 1b first performs a preprocess for character region data (S601) and then performs a suitable compression process for the character region data in accordance with the compression processing mode designated at step S501 (S602 to S607). In particular, if the speed preference mode is designated at step S501 (YES at step S602), then the image processing device 1b performs, from between the MMR compression and the JBIG compression, the MMR compression having a higher compression speed than the JBIG compression for the character region data (S603). Meanwhile, if the picture quality preference mode is designated at step S501 (NO at step S602 and YES at step S604), then the image processing device 1b performs the JBIB compression (S606) which exhibits lower deterioration than the MMR compression. However, if the size preference mode is designated (NO at step S602, NO at step S604 and YES at step S606), the image processing device 1b performs the JBIG compression which exhibits a higher compression ratio than the MMR compression (S607).

On the other hand, if the compression processing mode is not designated at step S501 and a compression method is designated at step S503 (NO at step S602, NO at step S604, NO at step S606 and YES at step S608), then the image processing device 1b performs a compression process for the character region data in accordance with the compression method for the character region data designated at step S503 (S609 to S611). However, if neither the compression processing mode nor a compression method is designated at step S501 or S503 (NO at step S602, NO at step S604, NO at step S606 and NO at step S608), then the image processing device 1b performs the MMR compression which is a default process for the character region data (S610).

Figure 12:
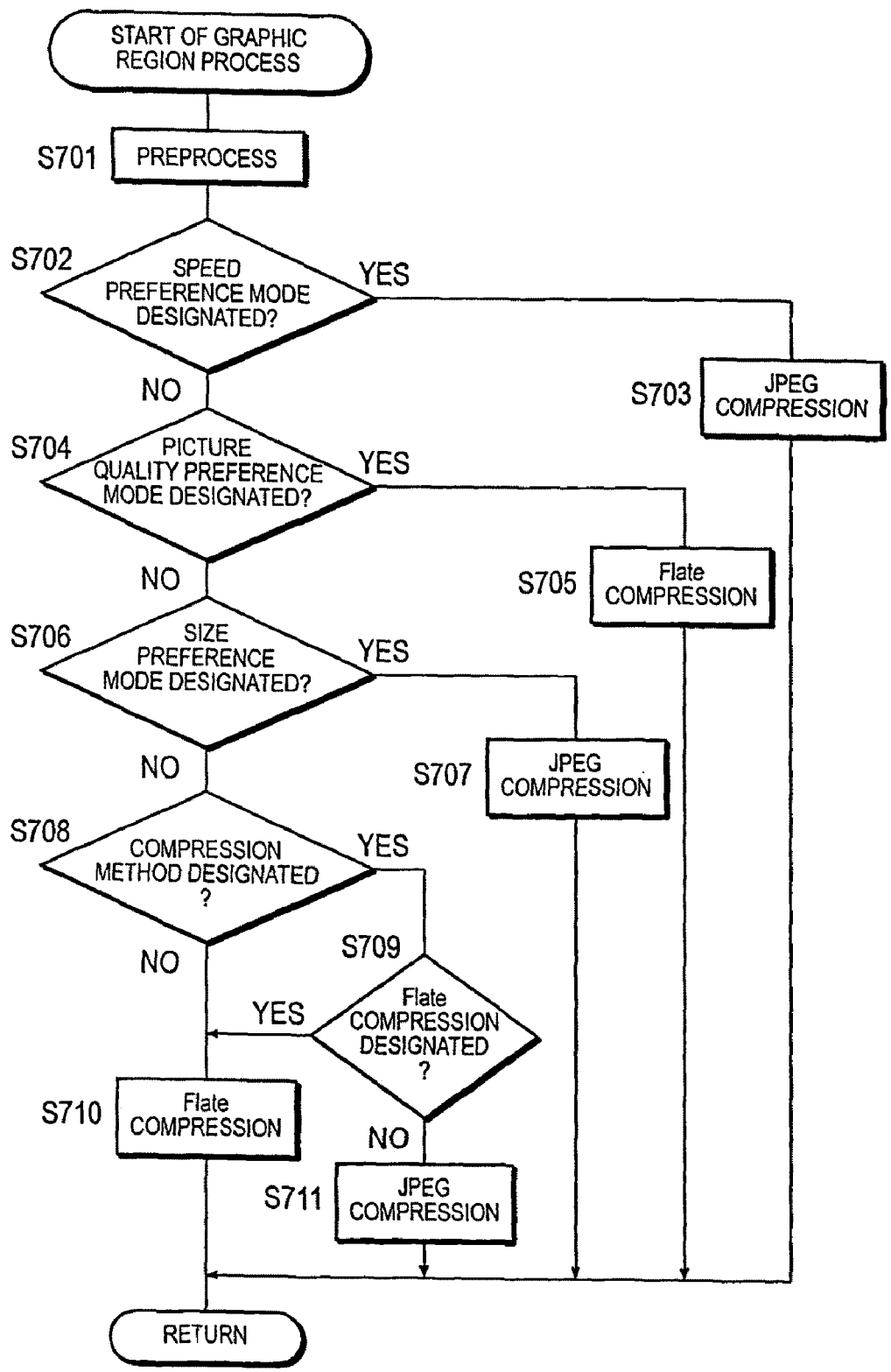
FIG. 12 is a flow chart illustrating a procedure of a graphic region process of the image processing device 1b.
Figure 13:
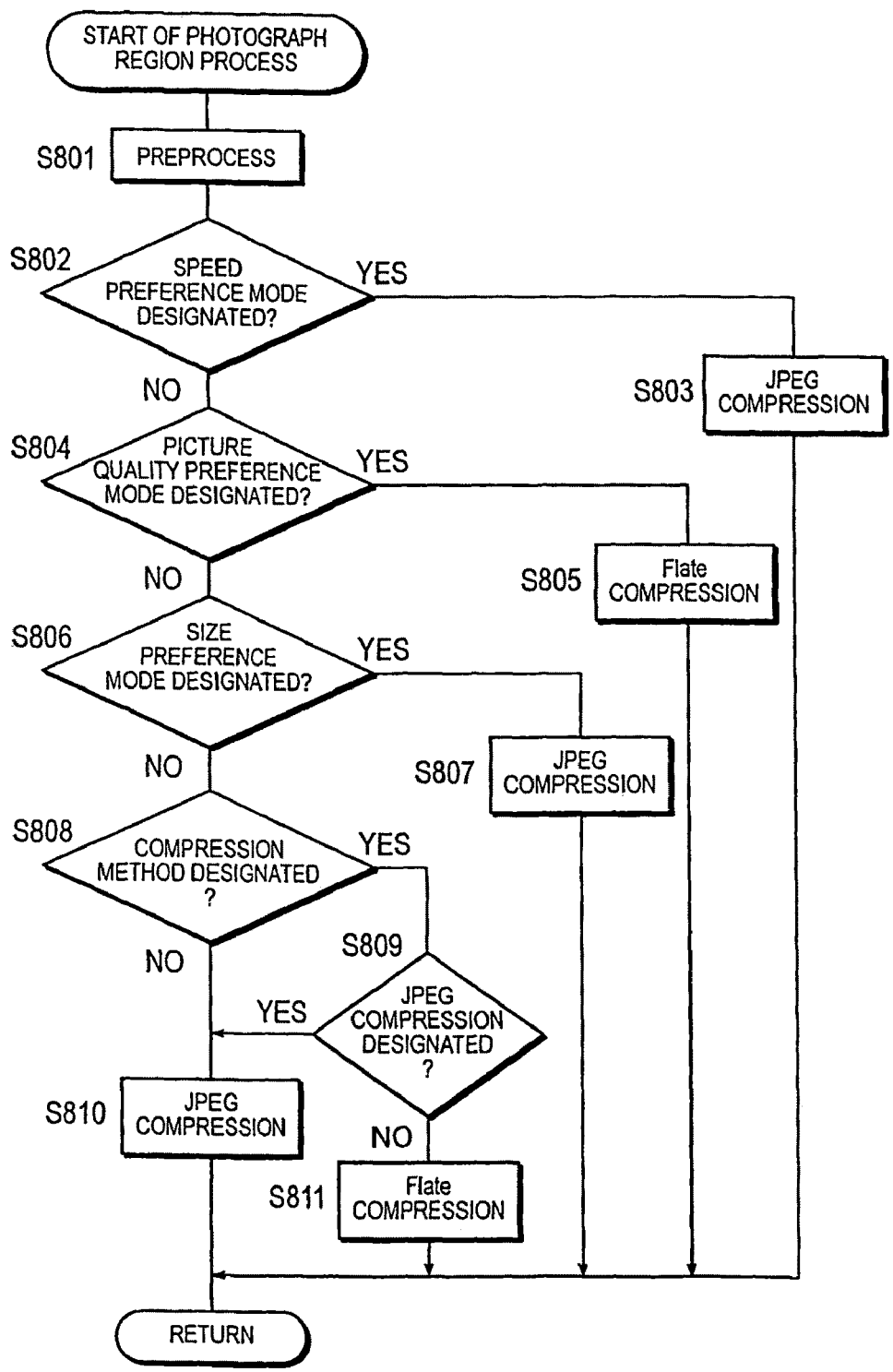
FIG. 13 is a flow chart illustrating a procedure of a photograph region process of the image processing device 1b.

FIGS. 12 and 13 are flow charts illustrating procedures of a graphic region process and a photograph region process according the present embodiment, respectively. Referring to FIGS. 12 and 13, the image processing device 1b performs a preprocess for graphic or photograph region data (S701 or S801). Then, if the speed preference mode is designated at step S501 (YES at step S702 or YES at step S802), then the image processing device 1b performs, from between the Flate compression and the JPEG compression, the JPEG compression which exhibits a higher compression speed than the Flate compression for the graphic or photograph region data (S703 or S803). On the other hand, if the picture quality preference mode is designated at step S501 (NO at step S702 and YES at step S704 or NO at step S802 and YES at step S804), then the Flate compression which exhibits less picture quality deterioration than the JPEG compression is performed (S705 or S805). However, if the size preference mode is designated (NO at step S702, NO at step S704 and YES at step S706 or NO at step S802, NO at step S804 and YES at step S806), then the JPEG compression which exhibits a higher compression ratio than the Flate compression is performed (S707 or S807).

On the other hand, if the compression process mode is not designated at step S501 and no compression method is designated at step S503 (NO at step S703, NO at step S704, NO at step 706 and YES at step S708 or NO at step S802, NO at step S804, NO at step S806 and YES at step S808), then the image processing device 1b performs a compression process for the graphic or photograph region data in accordance with the compression method for the graphic or photograph region data designated at step S503 (steps S709 to S711 or S809 to S811). However, if neither the compression process mode nor a compression method is designated at step S501 or S503 (NO at step S702, NO at step S704, NO at step S706 and NO at step S708 or NO at step S802, NO at step S804, NO at step S806 and NO at step S808), then the image processing device 1b performs the Flate compression or the JPEG compression, which is default compression, for the graphic or photograph region data (S710 or S810).

Referring now to FIG. 9, the image processing device 1b thereafter synthesizes the region data obtained by the image process described above based on the position information of the same to acquire composite image data (S512). Then, the image processing device 1b converts the composite image data into composite image data of the output file format (S513) and transmits the resulting output file to the file server 3 (S514).

In the second embodiment described above, one compression process mode is designated for the entire image process. However, the present invention is not limited to this and another configuration may be applied which makes it possible to designate a compression processing mode for each region data such that, for example, the speed preference mode is designated for character region data whereas the picture quality preference mode is designated for graphic and photograph region data.

In the embodiment described above, the MMR compression or the JBIG compression is performed for character region data whereas the Flate compression or the JPEG compression is performed for graphic region data and photograph region data. However, in the present invention, the compression methods which may be applied to such region data are not limited to them, but any combination of various compression methods may be applied to each region data.

Now, an image processing device according to a third embodiment of the present invention is described. The image processing device 1c according to the present embodiment has a configuration similar to that of the image processing device 1a according to the first embodiment described hereinabove. In particular, the image processing device 1c is connected to a scanner 2 and a file server 3 for mutual communication through a computer network 4 similarly to the image processing device 1a.

Referring to FIG. 3, while a compression method suitable for each extracted region data is applied to a compression process for the region data, one of compression methods suitable for character region data to be applied to a compression process for the character region data is the MMR compression. The MMR compression is reversible compression and can suppress deterioration of a character image, and exhibits a high processing speed and exhibits a higher compression ratio than the other reversible compressions such as the MH compression, MR compression and Flate compression. However, the MMR compression has a problem in that, from an algorithm thereof, where it is applied to character region data having a size smaller than a predetermined image size, the image size after the compression process is greater than that before the compression process. In particular, refer to (a) and (b) of FIG. 3, if character region data having a great image size such as character region data of a character region (1) is MMR compressed, then a good processing effect is obtained in terms of the picture quality, processing speed and compression ratio. However, if character region data of such a small size as in another character region (2) or (3) is MMR compressed, then the image size reversely increases after the compression when compared with that before the compression. In the present embodiment, the problem described is solved by changing over the compression method such that, to character region data having such a small size as described above, the Flate compression is applied so that, in whatever the image size thereof is small, the image size thereof after the compression process does not become greater than that before the compression process.

Figure 14:
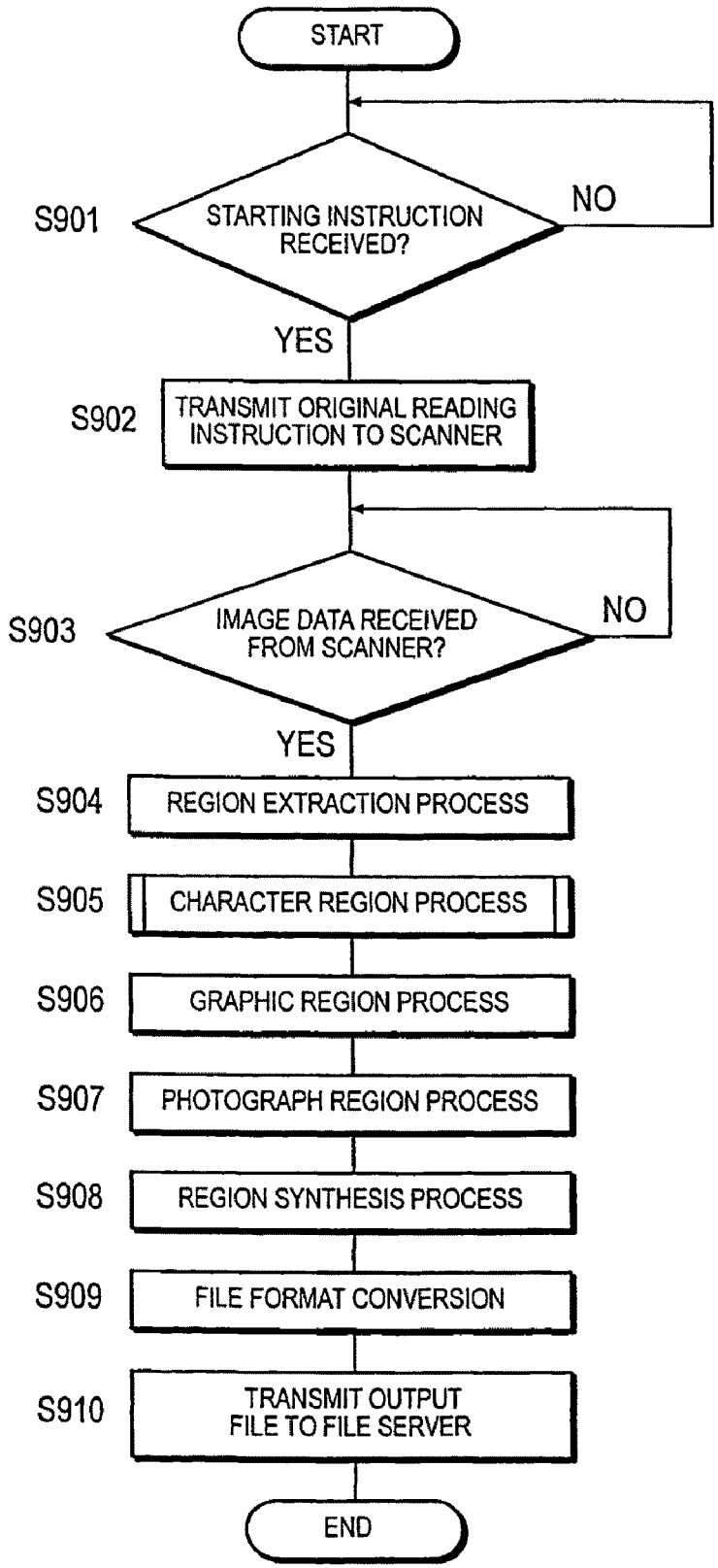
FIG. 14 is a flow chart illustrating a procedure of an image process of an image processing device 1c according to a third embodiment of the present invention.

FIG. 14 is a flow chart illustrating a procedure of the image process of the image processing device 1c according to the present embodiment. Referring to FIG. 14, the image processing device 1c waits until an image process starting instruction is received (NO at step S901). When an input of a starting instruction is accepted from the user through the operation section 103 (YES at step S901), the image processing device 1c transmits an original image reading instruction to the scanner 2 through the input interface section 104 (S902) and then waits until image data is received from the scanner 2 (NO at step S903). When the scanner 2 receives the reading instruction from the image processing device 1c, it reads an image of an original set at a predetermined position to produce image data of the original and transmits the resulting image data to the image processing device 1c. It is to be noted that the image process starting instruction may otherwise be inputted from a different device on the computer network 4 or directly from the scanner 2. In this instance, the steps S901 and S902 are omitted.

When the image data is received from the scanner 2 through the input interface section 104 (YES at step S903), the image processing device 1c stores the received image data into the storage section 102 and then uses the region extraction section 106 to separate character regions, graphic regions and photograph regions from the input image data to extract individual region data (S904).

Then, the image processing device 1c uses the region extraction section 106 to complement the extracted character regions with peripheral pixels to prepare non-character image data from the input image data and store the non-character image data into the storage section 102. Then, the region extraction section 106 discriminates graphic regions from the non-character image data to extract graphic region data and store the graphic region data into the storage section 102 together with position information of the regions.

Then, the region extraction section 106 complements the extracted graphic regions of the non-character image data with peripheral pixels to extract photograph region data from the non-character image data and store the photograph region data into the storage section 102 together with position information of the regions.

Thereafter, the image processing device 1c uses the image processing section 107 to perform an image process for each of the region data extracted at step S904 in accordance with the region type of the region data (S905 to S907).

Figure 15:
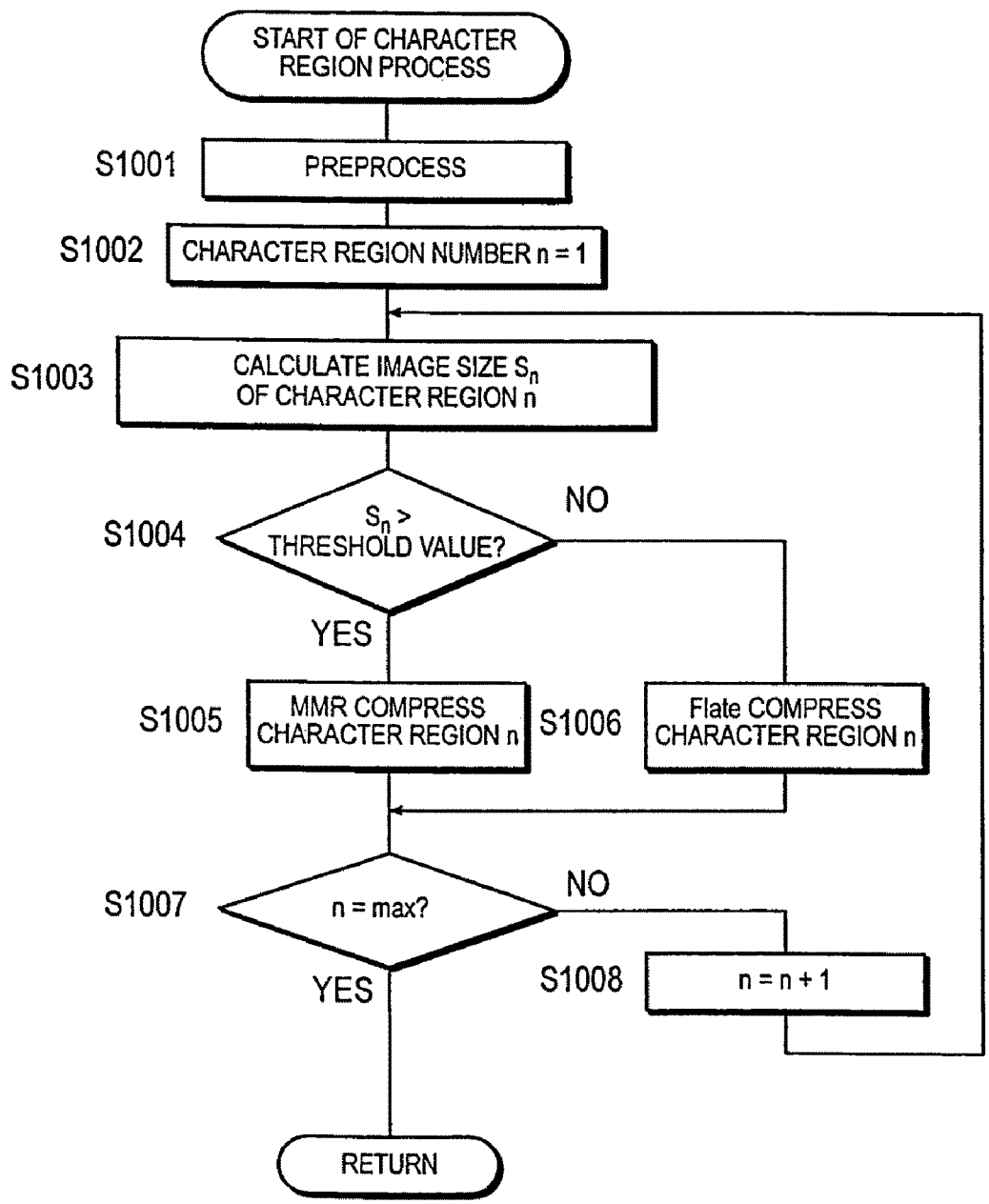
FIG. 15 is a flow chart illustrating a procedure of a character region process of the image processing device 1c.

FIG. 15 is a flow chart illustrating a procedure of the character region process of the image processing device 1c according to the present embodiment. Referring to FIG. 15, the image processing device is reads out character region data from the storage section 102 and uses the character region processing section 107a to perform a preprocess for the character region data (S1001). More particularly, the image processing device 1c uses the character region processing section 107a to detect a character color for each extracted character region data and binarize the character region data into 1-bit data. Then, the image processing device 1c uses the character region processing section 107a to calculate an image size for all of the character region data, compresses each of the character region data using the MMR compression or the Flate compression in accordance with the image size and stores the compressed character region data into the storage section 102 together with position information and so forth of the same (S1002 to S1008). In particular, the character region number n of an object of processing is initialized first (S1002), and the image size Sn of the character region n is calculated (S1003). Then, the calculated image size Sn of the character region n is compared with a threshold value (S1004). If the image size Sn is equal to or greater than the threshold value (YES at step S1004), then the character region n is compressed using the NMR compression (S1005), but if the image size Sn is smaller than the threshold value (NO at step S1004), then the character region n is compressed using the Flate compression (S1006). Then, the character region number n is successively incremented until it reaches a maximum value to repeat the steps S1004 to S1006 described above for all character region data (S1007 and S1008).

As described hereinabove, the MMR compression is a compression method suitable for character image regions totally from the point of view of the picture quality, processing speed and compression ratio. However, where the MMR compression is used for a compression process for character image data, if the character image data has an image size smaller than a predetermined image size, then the image size after the compression process becomes greater than that before the compression process. In contrast, where the Flate compression is applied to compression of character region data, it is inferior to the MMR compression in terms of all of the picture quality, processing speed and compression ratio. However, the Flate compression exhibits a compression effect also with regard to character region data of a very small size in that the image size after the compression process does not become greater than that before the compression process. Accordingly, the following countermeasure is taken in order to obtain image data with a high compression ratio while suppressing deterioration of the picture quality or reduction of the processing speed caused by a change of the compression method to the minimum. In particular, a value across which, when character region data is compressed by the MMR compression, the image size reverses before and after the compression process is set as a threshold value. Then, if character image data has an image size equal to or greater than the threshold value, then a compression process by the MMR compression which is a default compression and is suitable for a character image region is performed for the character image data. However, if character image data has an image size smaller than the threshold value, then a compression process by the Flate compression which does not exhibit an increase of the image size after the compression process with respect to the image size before the compression process is performed in place of the MMR compression for the character image data. It is to be noted that the threshold value used at step S1004 preferably is 140 to 250 bytes in the image size after the binarization at step S1001. However, the threshold value is not limited to the range given above.

Further, referring back to FIG. 14, after a smoothing process, a color subtraction process, a resolution conversion process and so forth are performed as a graphic region process for each graphic region data by the graphic region processing section 107b, the Flate compression or some other compression is performed as a reversible compression process, or the JPEG compression or some other compression is performed as an irreversible compression process. Then, resulting graphic region data is stored into the storage section 102 together with position information thereof (S906). Meanwhile, a resolution conversion process, a smoothing process and other necessary processes for the photograph region data are performed as a photograph region process by the photograph region processing section 107c, and then an irreversible compression process such as the JPEG process is performed for the photograph region data. Then, the resulting photograph region data is stored into the storage section 102 together with position information thereof.

It is to be noted that the image processes of the character region process (S905), graphic region process (S906) and photograph region process (S907) may be performed in any order.

Thereafter, the image processing device 1c uses the region synthesis section 108 to synthesize the region data obtained by the image processes described above based on the individual position information to acquire composite image data and store the composite image data into the storage section 102 (S908). Further, the image processing device 1c uses the file format conversion section 109 to convert the composite image data into composite image data of the output file format (S909). Then, the image processing device 1c transmits the resulting output file (document image file) to the file server 3 through the output interface section 105 and the computer network 4 (S910).

When the output file is received from the image processing device 1c through the computer network 4, the file server 3 stores the received file into a predetermined directory of the storage device such as a hard disk. Then, if a transfer request for the file is received from a different device on the computer network 4, then the file server 3 transfers the stored file to the different device through the computer network 4.

In the embodiment described above, the threshold value for an image size to be used for discrimination of whether the MMR compression should be performed or the Flate compression should be performed for each of character region data is set to a value across which the image size reverses before and after the compression process when the character region data is compressed using the MMR compression. However, the present invention is not limited to this. For example, the threshold value may otherwise be set to a value across which the image size reverses after the compression process when character region data is compressed using the MMR compression and the Flate compression.

Further, in the embodiment described above, the MMR compression or the Flate compression is applied as a compression process for character region data switchably in response to an image size. However, the present invention is not limited to the particular form, but a combination of compression methods different from those described above may be switchably applied to character region data, or a combination of compression methods same as or different from those described above may be applied switchably to the other region data.

Further, in the embodiment described above, the image processing device of the present invention separates and extracts a character region, a graphic region and a photograph region from image data to perform the compression process individually for types of the region data. However, the present invention is not limited to this. For example, the image processing device of the present invention may interpret a document file described in a page description language, and extract a object which is a component of the document file to perform the compression process individually for types of the object data.

In the embodiments described above, the image inputting source device in the image processing system of the present invention is a scanner while the image outputting destination device is a file server. However, the image inputting source device is not limited particularly if the image processing device of the present invention can acquire image data from the same. Thus, the image inputting source device may be an device which includes image reading unit, image data preparation unit, image data reception unit, image processing unit, image data storage unit or the like such as, for example, a facsimile device, a multi-function peripheral equipment (MFP) such as a digital copying machine, a digital camera, a personal computer, a work station, a server or the like. Meanwhile, the image outputting destination device is not limited particularly if it is an device which utilizes image data acquired from the image processing device of the present invention. Thus, the image inputting source device may be an device which includes image formation unit, image data transmission unit, image processing unit, image data storage unit or the like such as, for example, a facsimile device, a digital copying machine, a personal computer, a work station, a server or the like. Further, the image processing device of the present invention may be an device for exclusive use which includes such unit as mentioned above or may be formed as a computer for a scanner, a digital copying machine, a multi-function peripheral equipment (MFP) such as a facsimile device, a personal computer, a work station, a server or the like combined with image reading unit, image data preparation unit, image data reception unit, image data transmission unit, image formation unit, image data storage unit and so forth.

The image processing device according to the present invention can be implemented not only by a hardware circuit for exclusive use for executing the procedures described hereinabove but also by a CPU executing a specific program which describes the procedures described hereinabove. Where the present invention is implemented by the latter, the specific program described above for causing the image processing device to operate may be provided in the form of a computer-readable recording medium such as a flexible disk or a CD-ROM or may otherwise be provided on-line through a network such as the Internet. In this instance, the program recorded on a computer-readable recording medium is usually transferred to and stored into a ROM, a hard disk or the like. Further, the program may be provided as sole application software or may be incorporated in software of an image processing device as a function of the device.

As described above, according to the present invention, an image processing device which extracts character, graphic and photograph regions from image data acquired by reading an original document and performs image processing for the regions and then re-synthesizes them to prepare a document image file allows designation of a desired compression method for each region data. Therefore, an arbitrary compression process can be performed for each of the region data extracted from the input data. Further, according to the present invention, the image processing device automatically performs, in response to designation of a compression process mode, a compression process for each region data using an optimum compression method. Therefore, even if the user does not have particular knowledge of compression methods to be applied to the individual region data, desired compression processes can be executed for the region data.

Further, according to the present invention, in a case wherein execution of a compression process for specific region data using a default compression method, that is, a compression method suitable for the region results in increase of the image size after the compression process of region data whose image size is smaller than a predetermined value (threshold value) with respect to the image size before the compression process, the image processing device described above calculates the image size of the specific region data in advance and then performs, if the region data exhibits an image size equal to or greater than the threshold value, a compression process for the region data using the default compression method, but performs, if the region data exhibits an image size smaller than the threshold value, a compression process for the region data using a compression method which does not make the image size after the compression process greater than that before the compression process even if the image size is smaller than the threshold value. Therefore, image data can be obtained with a high compression ratio while deterioration of the picture quality and reduction of the processing speed by a change of the compression method are suppressed to the minimum.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An image processing device, comprising:
 a processor controlling one or more components of the image processing device;
 a region extraction unit for separating and extracting a character region, a graphic region and a photograph region from image data;
 a region compression unit for performing a compression process for each of the region data extracted by said region extraction unit;
 a region synthesis unit for synthesizing the region data compressed by said region compression unit; and
 an image size calculation unit for calculating an image size of specific region data extracted by said region extraction unit;
 said region compression unit using, when the image size of the specific region data calculated by said image size calculation unit is equal to or greater than a threshold value, a first compression method to perform the compression process for the specific region data, and said region compression unit using, when the image size of the specific region data calculated by said image size calculation unit is smaller than the threshold value, a second compression method to perform the compression process for the specific region data;
 wherein the first compression method is a compression method in which the image size after the compression process is greater than the image size before the compression process, if it is applied to the specific region data whose image size before the compression process is smaller than the threshold value, and
 wherein the second compression method is a compression method in which the image size after the compression process is not greater than the image size before the compression process, if it is applied to the specific region data whose image size before the compression process is smaller than the threshold value.

2. The image processing device according to claim 1, wherein the first compression method is a default compression method for the specific region data.

3. The image processing device according to claim 1, wherein the specific region data is character region data.

4. The image processing device according to claim 3, wherein the first compression method is the MMR compression and the second compression method is the Flate compression.

5. An image processing device, comprising:
 a processor controlling one or more components of the image processing device;
 an object extraction unit for interpreting a document file described in a page description language, and extracting an object which is a component of the document file,
 an object compression unit for performing a compression process for each of the object data extracted by said object extraction unit;
 an object synthesis unit for synthesizing the object data compressed by said object compression unit;
 an image size calculation unit for calculating an image size of the object data extracted by said object extraction unit; and
 a compression method selection unit for selecting a compression method of the compression process to be performed for each of the object data extracted by said object extraction unit in proportion to the image size of the object data calculated by said image size calculation unit from among a plurality of designated compression methods;
 said object compression unit performing the compression process for each of the object data using the compression method selected for the object data by said compression method selection unit;
 wherein said compression method selection unit selecting, when the image size of the object data calculated by said image size calculation unit is equal to or greater than a threshold value, a first compression method to perform the compression process for the object data, and said compression method selection unit selecting, when the image size of the object data calculated by said image size calculation unit is smaller than the threshold value, a second compression method to perform the compression process for the object data:
wherein the first compression method is a compression method in which the image size after the compression process is greater than the image size before the compression process, if it is applied to the object data whose image size before the compression process is smaller than the threshold value, and
wherein the second compression method is a compression method in which the image size after the compression process is not greater than the image size before the compression process, if it is applied to the object data whose image size before the compression process is smaller than the threshold value.

6. An image processing method, comprising:
a region extraction step of separating and extracting a character region, a graphic region and a photograph region from image data;
a region compression step of performing a compression process for each of the region data extracted by said region extraction step;
a region synthesis step of synthesizing the region data compressed by said region compression step; and
an image size calculation step of calculating an image size of specific region data extracted by said region extraction step;
said region compression step using, when the image size of the specific region data calculated by said image size calculation step is equal to or greater than a threshold value, a first compression method to perform the compression process for the specific region data, and said region compression step using, when the image size of the specific region data calculated by said image size calculation step is smaller than the threshold value, a second compression method to perform the compression process for the specific region data;
wherein the first compression method is a compression method in which the image size after the compression process is greater than the image size before the compression process, if it is applied to the specific region data whose image size before the compression process is smaller than the threshold value, and
wherein the second compression method is a compression method in which the image size after the compression process is not greater than the image size before the compression process, if it is applied to the specific region data whose image size before the compression process is smaller than the threshold value.

7. The image processing method according to claim 6, wherein the first compression method is a default compression method for the specific region data.

8. The image processing method according to claim 6, wherein the specific region data is character region data.

9. The image processing method according to claim 8, wherein the first compression method is the MMR compression and the second compression method is the Flate compression.

10. An image processing method, comprising:
a character region extraction step of separating and extracting character regions from image data;
an image size calculation step of calculating an image size of each of the character region data extracted by said character region extraction step;
a compression method selection step of selecting, when the image size of each of the character region data calculated by said image size calculation step is equal to or greater than a threshold value, the MMR compression as a compression method but selecting, when the image size of each of the character region data calculated by said image size calculation step is smaller than the threshold value, the Flate compression as a compression method; and
a region compression step of performing a compression process for each of the character region data using the compression method selected by said compression method selection step;
wherein the MMR compression method is a compression method in which the image size after the compression process is greater than the image size before the compression process, if it is applied to the character region data whose image size before the compression process is smaller than the threshold value, and
wherein the Flate compression method is a compression method in which the image size after the compression process is not greater than the image size before the compression process, if it is applied to the character region data whose image size before the compression process is smaller than the threshold value.

11. A non-transitory computer readable medium storing an image processing program for causing an image processing device to execute:
a region extraction step of separating and extracting a character region, a graphic region and a photograph region from image data;
a region compression step of performing a compression process for each of the region data extracted by said region extraction step;
a region synthesis step of synthesizing the region data compressed by said region compression step; and
an image size calculation step of calculating an image size of specific region data extracted by said region extraction step;
said region compression step using, when the image size of the specific region data calculated by said image size calculation step is equal to or greater than a threshold value, a first compression method to perform the compression process for the specific region data, and said region compression step using, when the image size of the specific region data calculated by said image size calculation step is smaller than the threshold value, a second compression method to perform the compression process for the specific region data;
wherein the first compression method is a compression method in which the image size after the compression process is greater than the image size before the compression process, if it is applied to the specific region data whose image size before the compression process is smaller than the threshold value, and
wherein the second compression method is a compression method in which the image size after the compression process is not greater than the image size before the compression process, if it is applied to the specific region data whose image size before the compression process is smaller than the threshold value.

12. The non-transitory computer readable medium according to claim 11, wherein the first compression method is a default compression method for the specific region data.

13. The non-transitory computer readable medium according to claim 11, wherein the specific region data is character region data.

14. The non-transitory computer readable medium according to claim 13, wherein the first compression method is the MMR compression and the second compression method is the Flate compression.

15. A non-transitory computer readable medium storing an image processing program for causing an image processing device to execute:

a character region extraction step of separating and extracting character regions from image data;

an image size calculation step of calculating an image size of each of the character region data extracted by said character region extraction step;

a compression method selection step of selecting, when the image size of each of the character region data calculated by said image size calculation step is equal to or greater than a threshold value, the MMR compression as a compression method but selecting, when the image size of each of the character region data calculated by said image size calculation step is smaller than the threshold value, the Flate compression as a compression method; and a region compression step of performing a compression process for each of the character region data using the compression method selected by said compression method selection step;

wherein the MMR compression method is a compression method in which the image size after the compression process is greater than the image size before the compression process, if it is applied to the character region data whose image size before the compression process is smaller than the threshold value, and wherein the Flate compression method is a compression method in which the image size after the compression process is not greater than the image size before the compression process, if it is applied to the character region data whose image size before the compression process is smaller than the threshold value.

* * * * *